United States Patent
Guo et al.

(10) Patent No.: US 12,438,675 B2
(45) Date of Patent: Oct. 7, 2025

(54) SYNCHRONIZATION FOR OFDM-BASED OVER-THE-AIR AGGREGATION

(71) Applicants: The Hong Kong University of Science and Technology, Kowloon (HK); The University of Hong Kong, Hong Kong (HK)

(72) Inventors: Huayan Guo, New Territories (HK); Yifan Zhu, New Territories (HK); Haoyu Ma, New Territories (HK); Vincent Kin Nang Lau, Tseung Kwan O (HK); Kaibin Huang, New Territories (HK)

(73) Assignees: THE HONG KONG UNIVERSITY OF SCIENCE AND TECHNOLOGY, Kowloon (HK); THE UNIVERSITY OF HONG KONG, Hong Kong (HK)

( * ) Notice: Subject to any disclaimer, the term of this patent is extended or adjusted under 35 U.S.C. 154(b) by 356 days.

(21) Appl. No.: 18/303,104

(22) Filed: Apr. 19, 2023

(65) Prior Publication Data
US 2023/0344602 A1    Oct. 26, 2023

Related U.S. Application Data

(60) Provisional application No. 63/333,113, filed on Apr. 20, 2022.

(51) Int. Cl.
*H04L 5/00* (2006.01)
*H04L 27/26* (2006.01)

(52) U.S. Cl.
CPC .......... *H04L 5/0053* (2013.01); *H04L 5/0078* (2013.01); *H04L 27/2605* (2013.01)

(58) Field of Classification Search
CPC .. H04L 5/0053; H04L 5/0078; H04L 27/2605
See application file for complete search history.

(56) References Cited

U.S. PATENT DOCUMENTS

2021/0266203 A1* 8/2021 Yoo .................. H04L 25/03165
2022/0070028 A1* 3/2022 Yerramalli ............. G01S 3/043

FOREIGN PATENT DOCUMENTS

| WO | 2022/014731 A1 | 3/2022 |
| WO | 2022/050466 A1 | 3/2022 |
| WO | 2022/051964 A1 | 3/2022 |

OTHER PUBLICATIONS

Konecny et al., "Federated Optimization: Distributed Optimization Beyond the Datacenter", arXiv:1511.03575v1, Nov. 11, 2015, 5 pages.

(Continued)

*Primary Examiner* — Samina F Choudhry
(74) *Attorney, Agent, or Firm* — Amin, Turocy & Watson, LLP

(57) ABSTRACT

A system can receive respective data from respective sensors, wherein the respective data represents respective gradient values for a neural network produced by the respective first sensors according to a federated learning process. The system can transform the respective data into respective analog waveforms. The system can apply orthogonal frequency-division multiplexing to the respective analog waveforms to produce respective aligned analog waveforms. The system can create a superposition analog waveform that comprises a superposition of the respective aligned analog waveforms. The system can transmit the superposition analog waveform to an access point, wherein the access point is configured to update the neural network with the superposition analog waveform according to the federated learning process.

20 Claims, 17 Drawing Sheets

(56) References Cited

OTHER PUBLICATIONS

Konecny et al., "Federated Optimization: Distributed Machine Learning for On-Device Intelligence", arXiv:1610.02527v1, Oct. 8, 2016, 38 pages.
McMahan et al., "Communication-Efficient Learning of Deep Networks from Decentralized Data", Proceedings of the 20th International Conference on Artificial Intelligence and Statistics, arXiv:1602.05629, 2017, 10 pages.
Kairouz et al., "Advances and Open Problems in Federated Learning", arXiv:1912.04977v3, Mar. 9, 2021, 121 pages.
Li et al., "Federated Learning: Challenges, Methods, and Future Directions", IEEE Signal Processing Magazine, May 2020, pp. 50-60.
Yang et al., "Federated Machine Learning: Concept and Applications", ACM Transactions on Intelligent Systems and Technology, vol. 10, No. 2, Article 12, Feb. 13, 2019, 19 pages.
Bernstein et al., "signSGD: Compressed Optimisation for Nonconvex Problems", Proceedings of the 35th International Conference on Machine Learning, 2018, 10 pages.
Wang et al., "Atomo: Communication-efficient Learning via Atomic Sparsification", 32nd Conference on Neural Information Processing Systems, 2018, 12 pages.
Yang et al., "Scheduling Policies for Federated Learning in Wireless Networks", IEEE Transactions on Communications, arXiv:1908.06287v1, Aug. 17, 2019, 17 pages.
Tran et al., "Federated Learning Over Wireless Networks: Optimization Model Design and Analysis", INFOCOM 2019, IEEE Conference on Computer Communications, 2019, pp. 1387-1395.
Shi et al., "Joint Device Scheduling and Resource Allocation for Latency Constrained Wireless Federated Learning", arXiv:2007.07174v1, IEEE, Jul. 14, 2020, 30 pages.
Luo et al., "HFEL: Joint Edge Association and Resource Allocation for Cost-efficient Hierarchical Federated Edge Learning", arXiv:2002.11343v2, Jun. 6, 2020, 30 pages.
Chen et al., "A Joint Edge Association and Resource Allocation for Cost-efficient Hierarchical Federated Edge Learning", IEEE, arXiv:1909.07972v4, Jan. 29, 2022, 32 pages.
Amiri et al., "Convergence of Update Aware Device Scheduling for Federated Learning at the Wireless Edge", IEEE Transactions on Wireless Communications, vol. 20, No. 6, Jun. 2021, pp. 3643-3658.
Chen et al., "Convergence Time Optimization for Federated Learning over Wireless Networks", IEEE Transactions on Wireless Communications, vol. 20, No. 4, Apr. 2021, 15 pages.
Ren et al., "Scheduling for Cellular Federated Edge Learning with Importance and Channel Awareness", IEEE Transactions on Wireless Communications, vol. 19, No. 11, Nov. 2020, pp. 7690-7703.
Tang et al., "Over-the-Air Aggregation with Multiple Shared Channels and Graph-Based State Estimation for Industrial IoT Systems", IEEE Internet of Things, vol. 8, No. 19, Oct. 1, 2021, pp. 14638-14657.
Cai S et al., "MSE Tail Analysis for Remote State Estimation of Linear Systems Over Multi-antenna Random Access Channels", IEEE Transactions on Automatic Control, vol. 65, No. 5, May 2020, pp. 2046-2061.
Tang et al., "Remote State Estimation With Asynchronous Mission-Critical IoT Sensors", IEEE Journal on Selected Areas in Communications, vol. 39, No. 3, Mar. 2021, pp. 835-850.
Cai et al., "Cloud-Assisted Stabilization of Large-Scale Multiagent Systems by Over-the-Air-Fusion of IoT Sensors", IEEE Internet of Things Journal, vol. 6, No. 5, Oct. 2019, pp. 7748-7759.
Gastpar, Michael, "Uncoded Transmission is Exactly Optimal for a Simple Gaussian Sensor Network", IEEE Transactions on Information Theory, vol. 54, No. 11, Nov. 2008, pp. 5247-5251.
Chen et al., "A Uniform-Forcing Transceiver Design for Over-the-Air Function Computation Letters", IEEE Wireless Communications Letters, vol. 7, No. 6, Dec. 2018, pp. 942-945.
Wen et al., "Reduced-Dimension Design of MIMO Over-the-Air Computing for Data Aggregation in Clustered IoT Networks", IEEE Transactions on Wireless Communications, vol. 18, No. 11, Nov. 2019, pp. 5255-5268.
Zhu et al., "MIMO Over-the-Air Computation for High-Mobility Multimodal Sensing", IEEE Internet of Things Journal, vol. 6, No. 4, Aug. 2019, pp. 6089-6103.
Amiri et al., "Federated Learning Over Wireless Fading Channels", IEEE Transactions on Wireless Communications, vol. 19, No. 5, May 2020, pp. 3546-3557.
Yang et al., "Federated Learning via Over-the-Air Computation", IEEE Transactions on Wireless Communications, vol. 19, No. 3, Mar. 2020, pp. 2022-2035.
Zhu et al., "Broadband Analog Aggregation for Low-latency Federated Edge Learning", IEEE Transactions on Wireless Communications, vol. 19, No. 1, Jan. 2020, pp. 491-506.
Amiri et al., "Machine Learning at the Wireless Edge: Distributed Stochastic Gradient Descent Over-the-Air", IEEE Transactions on Signal Processing, arXiv:1901.00844v3, Apr. 7, 2020, 15 pages.
Guo et al., "Analog Gradient Aggregation for Federated Learning Over Wireless Networks: Customized Design and Convergence Analysis", IEEE Internet of Things Journal, vol. 8, No. 1, Jan. 1, 2021, pp. 197-210.
Sery et al., "Over-the-Air Federated Learning From Heterogeneous Data", IEEE Transactions on Signal Processing, vol. 69, 2021, pp. 3796-3811.
Su et al., "Data and Channel-Adaptive Sensor Scheduling for Federated Edge Learning via Over-the-AirGradient Aggregation", IEEE Internet of Things Journal, vol. 9, No. 3, Feb. 1, 2022, pp. 1640-1654.
Su et al., "Hierarchical Federated Learning for Hybrid Data Partitioning Across Multitype Sensors", IEEE Internet of Things Journal, vol. 8, No. 13, Jul. 1, 2021, pp. 10922-10939.
Sery et al., "On Analog Gradient Descent Learning Over Multiple Access Fading Channels", IEEE Transactions on Signal Processing, vol. 68, 2020, pp. 2897-2911.
Yang et al., "Revisiting Analog Over-the-Air Machine Learning: The Blessing and Curse of Interference", arXiv:2107.11733v2, Dec. 2, 2021, 13 pages.
Kortke et al., "Analog Computation Over the Wireless Channel: A Proof of Concept", IEEE Sensors, Nov. 2, 2014, 4 pages.
Altun et al., "A Testbed Based Verification of Joint Communication and Computation Systems", IEEE 25th Telecommunication Forum TELFOR, Nov. 21-22, 2017, 4 pages.
Sourour et al., "Frequency Offset Estimation and Correction in the IEEE 802.11a WLAN", IEEE 60th Vehicular Technology Conference, 2004, pp. 4923-4927.
Sahin, Alphan, "A Demonstration of Over-the-Air Computation for Federated Edge Learning", IEEE Globecom Workshops, 2022, pp. 1821-1827.
Sahin et al., "Over-the-Air Computation with DFT-spread OFDM for Federated Edge Learning", IEEE Wireless Communications and Networking Conference (WCNC), 2022, pp. 1886-1891.
Zhu et al., "One-Bit Over-the-Air Aggregation for Communication-Efficient Federated Edge Learning: Design and Convergence Analysis", arXiv Papers, 2001, 1-20 pages.
Aygun, Ozan, "On Federated Learning Over Wireless Channels with Over-the-air Aggregation", Electrical and Electronics Engineering, Jul. 2022, 115 pages.
Sahin et al., "Over-the-Air Computation with DFT-spread OFDM for Federated Edge Learning", arXiv:2112.13439v1, Dec. 26, 2021, 7 pages.
Zhang et al., "Turning Channel Noise into an Accelerator for Over-the-Air Principal Component Analysis", IEEE, arXiv:2104.10095v3, Apr. 1, 2022, 16 pages.
Thakallapelli et al., "Real-time Frequency Based Reduced Order Modeling of Large Power Grid", Power and Energy Society General Meeting, 2016, 6 pages.
Chen et al., "A Joint Learning and Communications Framework for Federated Learning Over Wireless Networks", IEEE Transactions on Wireless Communications, vol. 20, No. 1, Jan. 2021, pp. 269-283.

(56) References Cited

OTHER PUBLICATIONS

Alistarh et al., "QSGD: Communication-Efficient SGD Via Gradient Quantization and Encoding", Proceedings of the 31st International Conference on Neural Information Processing Systems, 2017, 12 pages.

* cited by examiner

1200

SYNCHRONIZATION FOR OFDM-BASED OVER-THE-AIR AGGREGATION

CROSS REFERENCE TO RELATED APPLICATION

This is a nonprovisional claiming priority under 35 U.S.C. § 119 of U.S. Provisional Patent Application No. 63/333,113, filed on Apr. 20, 2022, entitled "Synchronization Solution And System Design For OFDM-Based Over-The-Air Aggregation Technique", the entirety of which prior application is hereby incorporated by reference herein.

BACKGROUND

Over-the-air (OTA) aggregation is a technique to address scalability issues of wireless federated learning.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive respective data from respective sensors, wherein the respective data represents respective gradient values for a neural network produced by the respective first sensors according to a federated learning process. The system can transform the respective data into respective analog waveforms. The system can apply orthogonal frequency-division multiplexing to the respective analog waveforms to produce respective aligned analog waveforms. The system can create a superposition analog waveform that comprises a superposition of the respective aligned analog waveforms. The system can transmit the superposition analog waveform to an access point, wherein the access point is configured to update the neural network with the superposition analog waveform according to the federated learning process.

An example method can comprise receiving, by a system comprising a processor, respective data from respective sensors, wherein the respective data represents respective gradient values for a neural network. The method can further comprise transforming, by the system, the respective data into respective analog waveform. The method can further comprise applying, by the system, orthogonal frequency-division multiplexing to the respective analog waveforms to produce respective aligned analog waveform. The method can further comprise creating, by the system, a superposition analog waveform that comprises a superposition of the respective aligned analog waveforms. The method can further comprise storing, by the system, the superposition analog waveform, wherein an access point is configured to update the neural network with the superposition analog waveform according to a federated learning process.

An example non-transitory computer-readable medium can comprise instructions that, in response to execution, cause a system comprising a processor to perform operations. These operations can comprise receiving first data from a first sensor, wherein the first data represents first gradient values for a neural network. These operations can further comprise receiving second data from a second sensor, wherein the second data represents second gradient values for the neural network. These operations can further comprise transforming the first data into a first analog waveform. These operations can further comprise transforming the second data into a second analog waveform. These operations can further comprise applying orthogonal frequency-division multiplexing to the first analog waveform and the second analog waveform to produce a first aligned analog waveform, and a second aligned analog waveform, respectively. These operations can further comprise creating a superposition analog waveform that comprises a superposition of the first aligned analog waveform and the second aligned analog waveform. These operations can further comprise storing the superposition analog waveform, wherein an access point is configured to update the neural network with the superposition analog waveform according to a federated learning process.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
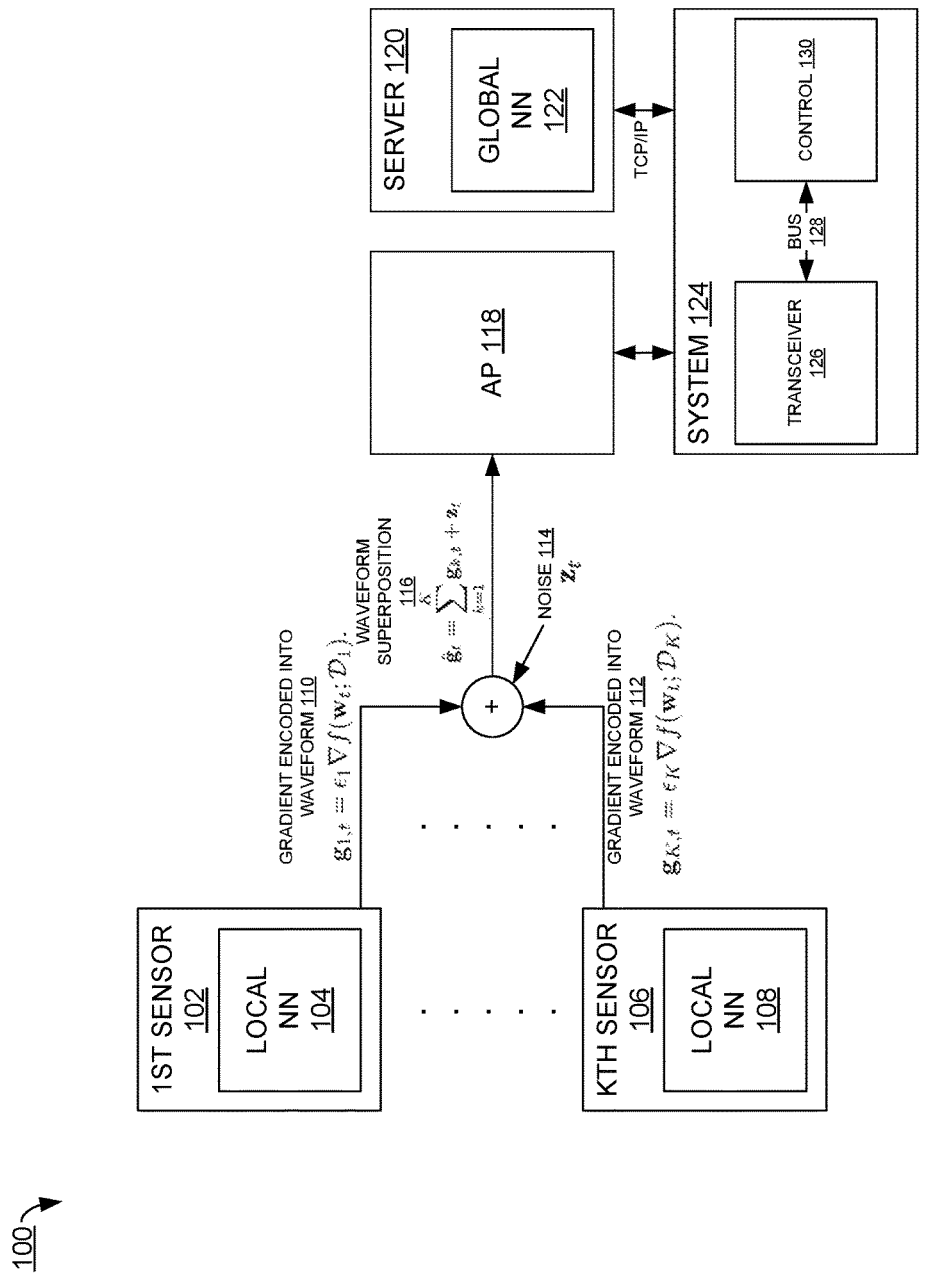
FIG. 1 illustrates an example system architecture that can facilitate synchronization for OFDM-based over-the-air (OTA) aggregation.

The present techniques can be implemented to facilitate orthogonal-frequency-division-multiplexing (OFDM)-based over-the-air (OTA) aggregation. These techniques can be implemented to achieve a much higher transmission efficiency than the prior OTA aggregation techniques, which can benefit a wireless federated learning (FL) application in which millions of gradients/weights will be transmitted. In OTA-FL, the local gradients/weights in Internet of Things (IoT) devices can be modulated by an analog waveform, and can then be transmitted using the same wireless resources as used for other communications.

To this end, in some examples, achieving perfect waveform superposition can be performed. This can be difficult for an OFDM-based frame due to the existence of frame timing offset (TO) and carrier frequency offset (CFO). In order to address these issues, the present techniques can be implemented to implement frame synchronization with a customized multiple access protocol that can estimate and then mitigate the TO and CFO for the OTA aggregation.

Wireless federated learning (FL) can comprise a technique that enables a deep neural network (DNN) to be collaboratively trained by IoT sensors, with coordination of an edge parameter server connecting to an access point (AP), while a raw dataset is stored locally without exchange, which can preserve priority. In particular, the IoT sensors can iteratively update their local model weights/gradients locally based on their own datasets, according to a broadcast common global model, and then synchronize a new global model via weights/gradients aggregation to a parameter server. As a result, uplink weights/gradients aggregation can become a primary bottleneck because many sensors can be involved, but a radio resource is limited.

There are prior approaches to reduce an aggregation overhead based on conventional multiple access protocols that can allocate dedicated radio resources to different sensors. However, prior approaches generally deal with tradeoffs between aggregation overhead and accuracy in federated learning. When fixing target learning accuracy, an aggregation overhead generally grows proportionally to a number of sensors, which can be large, so it can impose a large requirement on a radio resource.

OTA aggregation can be implemented to address problems with scalability, because it can be that FL aggregation only concerns a summation of local weights/gradients instead of individual updates. Specifically, it can be that all sensors transmit local updates with analog uncoded modulation in one common radio resource block by exploiting a free aggregation property in wireless channels, such that a required wireless radio resource becomes independent to a number of sensors. In addition, an increase of involved sensors can be beneficial with a proper design since a total power of the aggregated signals increases.

Analog waveform superposition can be used to facilitate a success of OTA aggregation in FL. Prior approaches have supposed that waveform superposition can be perfectly done, since similar techniques have been verified and applied for modulation-free remote state estimations and an OTA fusion of sensor measurements. However, those approaches that deal with waveform misalignment for sensor measurements can become impractical for OTA-FL, since. Number of weights in DNNs to be transmitted can be as large as millions, which can be much larger than that in sensor measurement. The present techniques can be implemented to facilitate analog waveform superposition with implementation validation for OTA-FL to achieve a higher transmission efficiency than existing techniques.

Prior approaches to OTA-FL generally focus on user scheduling and power control to minimize a mean squared error (MSE) on aggregated weights/gradients, and a modification of a learning algorithm to ensure that the FL problem can converge to a same optimum as in a noise-free case. For example, a channel-inversion transmitter can be used to extract an unbiased estimator of updated weights/gradients. In other examples, time-varying pre-coding can be used to mitigate noise by exploiting non-stationarity of gradient updates. In other examples, joint channel-and-data-aware-user scheduling can be implemented with dynamic residual feedback to guarantee a training convergence. In other examples, a hierarchical OTA-FL can be implemented for vertical data partitioning. In other examples, training can converge even without transmit power control and user scheduling by designing a dynamic learning rate.

A problem with implementing OTA can be waveform misalignment, since sensors can experience different multi-path propagations, and also suffer different frame timing offsets (TOs). Misaligned waveforms can cause super-position distortion, as well as result in inter-symbol interference in existing implementation validation works in which time-domain waveform design is adopted. In order to alleviate this issue, a direct-sequence spread spectrum (DSSS) technique can be used, according to prior techniques, which can multiply each analog data symbol by a pseudo-random sequence with good correlation characteristics. By setting a long pseudo-random sequence (N), a high-quality waveform superposition can be achieved, but the transmission efficiency can be reduced to 1/N. In some examples, this efficiency loss can be negligible for remote state estimations and sensor measurements, since in these scenarios, the size of the data to be transmitted can be small. However, it can become a critical challenge for OTA-FL, since DNNs can contain millions of weights, which can lead to a substantial increase in resource demand.

The present techniques can be implemented to facilitate effective waveform super-position, with implementation validation, for OTA-FL by utilizing an N-point OFDM transmission. In contrast to prior approaches for sensor measurements, the waveforms from different sensors can be aligned automatically in frequency-domain sub-carriers, while a time-domain misalignment issue can be addressed by L-length cyclic prefixes. In such a scenario, transmission efficiency can be improved to $(N-L)/N$ (while $N \gg L$). In addition, the present techniques can be implemented to facilitate an efficient protocol to address a phase noise issue in a frequency domain due to the adopting of OFDM modulation. Finally, a real-world implementation is designed to verify an effectiveness of the proposed techniques.

Issues addressed according to the present techniques include an OFDM-based effective waveform superposition solution for OTA-FL that utilizes OFDM modulation to address a problem with waveform misalignment in prior approaches. By exploiting a circular convolution property, waveforms from different sensors can be aligned automatically in frequency-domain sub-carriers with an aid of dime-domain cyclic prefixes. Transmission efficiency can be improved by setting a long OFDM symbol length.

Another issue addressed according to the present techniques comprises a protocol for phase error pre-compensation. After utilizing OFDM, an original time-domain symbol misalignment issue can be transformed into a phase noise effect in a frequency domain. The present techniques can be implemented to estimate and pre-compensate phase noise by adding a signaling round before consecutive OTA frames for data transmission. Additional pilot overhead can be scalable to a number of involved sensors, and can be negligible compared to an amount of data to be transmitted.

The present techniques can also be implemented to provide real-world implementation design and experimental validation. A real-world implementation can be implemented to prove a concept of OTA-FL with waveform superposition according to the present techniques. The implementation can be designed based on a software defined radio (SDR) approach, in which there is one AP and two IoT sensors. A neural network (NN) that predicts a received signal strength (RSS) given global positioning system (GPS) information can be trained. Experimental results can confirm that OTA-FL training can be performed successfully with waveform superposition according to the present techniques.

According to the present techniques, an OFDM-based over-the-air aggregation solution for a real-world federated learning task can be implemented. Specifically, an effect of frame timing offset and carrier frequency offset in the over-the-air aggregation channel can be analyzed, and a two-stage waveform pre-equalization technique with a customized multiple access protocol can be implemented to estimate and mitigate a timing offset and carrier frequency offset for over-the-air aggregation. Based on a protocol according to the present techniques, a implementation can be developed with a hardware transceiver and corresponding application software to train a deep neural network that predicts the radio signal strength with global positioning system information. To verify performance of the example implementation, experimental measurements can be performed, and they can be compared to learning results of over-the-air aggregation with offline learning results. From experimental results, it can be seen that a OFDM-based over-the-air aggregation implementation according to the present techniques is capable for real-world federated learning tasks.

FIGURES

FIG. 1 illustrates an example system architecture 100 that can facilitate synchronization for OFDM-based OTA aggregation. System architecture 100 comprises 1st sensor 102, local NN 104, Kth sensor 106, local NN 108, gradient encoded into waveform 110, gradient encoded into waveform 112, noise 114, waveform superposition 116, AP 118, server 120, global NN 122, system 124, transceiver 126, bus 128, and control 130. FIG. 1 illustrates an OTA aggregation FL system. Sensors can train local NNs with local datasets and upload the gradients. The gradients can be aggregated in a wireless channel with an analog waveform and can be received by the access point (AP). The aggregated gradients can be used to update a global NN in a server.

In FL, K sensors can collaboratively train a global model, which minimizes a training objective function, given as follows, with respect to the model weight parameters ω:

$$\mathcal{P}(A) \min_{w} \sum_{k=1}^{K} \varepsilon_k f(w; \mathcal{D}_k),$$

where $f(\cdot)$ denotes the learning model function, $\mathcal{D}_k$ denotes the k-th user's local dataset, and $\varepsilon_k$ denotes the ratio of the dataset size to the global dataset. In the t-th training round, the model weight $\omega_t$ can be broadcast from the server to all the sensors. Each sensor can then calculate the local gradient:

$$g_{k,t} = \varepsilon_k \nabla f(\omega_t; \mathcal{D}_k). \quad (1)$$

Instead of updating $g_{k,t}$ via the error-free channel by allocating dedicated resource to each user, the AP can aggregate all the gradients in a common wireless resource, as shown in FIG. 1. If perfect waveform superposition is achieved, the server can aggregate an unbiased estimation of the true gradient by utilizing the channel-inversion transmitter:

$$\hat{g}_t = \sum_{k=1}^{K} g_{k,t} + z_t, \quad (2)$$

where $z_t$ is the additive noise. Then, stochastic gradient descent (SGD) can be applied to update the model, which can guarantee that the training can converge to a first-order optimum with a proper stepsize design:

$$\omega_{t+1} = \omega_t - \eta_t \hat{g}_t, \quad (3)$$

where $\eta_t$ is the stepsize.

The present techniques can be implemented to effectively realize equation (2) in practice. That is, a symbol-level coherent superposition of analog waveforms from the sensors can be realized, which can bear the information of local gradients $g_{k,t}$ for all k and t.

Denote the digital baseband time-domain symbol by x[m] for m=1, 2, . . . , M. The corresponding continuous transmitted signal $x(t) = \sum_{m=1}^{M} x[m] g_T(t - m T_s)$ can be constructed by {x[m]} with a pulse-shaping filter $g_T(t)$, where $T_s$ denotes the baseband sampling period. For conventional point-to-point transmission, the received signal can be given by $$r(t) = x(t) * h(t) e^{j2\pi \Delta f t} + w(t), \quad (4)$$

where * denotes the convolution operation, $w(t) \sim \mathcal{CN}(0, \sigma^2)$ is the additive white Gaussian noise, $\Delta f$ is the CFO, and h(t) is the multipath channel response, which is given by $$h(t) = \sum_{p=1}^{P} a_p \delta(t - \tau_p), \quad (5)$$

where $\delta(\cdot)$ is the Dirac delta function, $a_p$ and $\tau_p$ are the channel gain and path delay of the p-th path (p=1, 2, . . . , P), respectively. Next, the received signal r(t) can be down-sampled to discrete values with a TO (denoted by ΔT) due to imperfection of the frame synchronization, yielding $$r[m] = x(t) * h(t)\delta(t - mT_s - \Delta T)e^{j2\pi\Delta ft} + w[m] \\ = x(t) * h(t + \Delta T)\delta(t - mT_s)e^{j2\pi\Delta ft} + w[m]. \quad (6)$$

The effective channel can be defined as follows:

$$\bar{h}(t) = h(t + \Delta T). \quad (7)$$

For an N-point OFDM system, according to a Fourier transform relationship between a delay domain and a frequency domain, the effective channel of the n-th sub-carrier ($\bar{h}[n]$) can be given by $$\bar{h}[n] = \mathcal{F}[\bar{h}(t)]\delta(f - nf_s/N) \\ = e^{j2\pi nf_s \Delta T/N} \sum_p a_p e^{-j2\pi nf_s \tau_p/N}, \\ = e^{j2\pi nf_s \Delta T/N} \tilde{a}[n] \quad (8)$$

where $\mathcal{F}[\bullet]$ denotes the Fourier transform, $f_s = 1/T$ is the baseband sampling rate, and $\tilde{a}[n]$ is the multipath channel coefficient.

In implementation according to the present techniques, the transmission frames consist of three basic sub-frames.

The frame timing (FT) sub-frame can be used to identify the starting point of a frame, which can be determined when a correlation peak is observed by the match filter. In particular, the FT sequence can adopt the up-sampled time-domain differential encoded pseudo-random binary phase-shift keying (BPSK) sequence as follows:

$$x_{FT}[m+2] = x_{FT}[m] \oplus q[m], \quad (9)$$

for m=1, ..., $M_{FT}$, where mod($M_{FT}$,2)=0. In this example, define $x_{FT}[1] = x_{FT}[2] = 1$, and $$q = \left\{ q[1], q[1], \ldots, q\left[\frac{M_{FT}}{2}\right], q\left[\frac{M_{FT}}{2}\right] \right\} \in \{-1, 1\}^{(M_{FT}) \times 1}$$

as the pseudo-random BPSK sequence.

The CFO estimation sub-frame can be generated by choosing one active sub-carrier whose index is $n_{CFO}$:

$$x_{CFO}[m] = \tilde{x}[n_{CFO}]e^{j2\pi mn_{CFO}/N}, \quad m=1, \ldots, M_{CFO}, \quad (10)$$

where $M_{CFO} > N$ is the sequence length, and $\tilde{x}[n_{CFO}] \in \mathbb{R}$ is the frequency-domain pilot symbol.

In an implementation according to the present techniques, OFDM can be adopted for both data transmission and OTA aggregation. Suppose that a successful coarse CFO compensation has been achieved, while the residual CFO is given by $\Delta f_r = \Delta f - \Delta \hat{f}$, where $\Delta \hat{f}$ is the estimated CFO. When $\kappa N \Delta f_r T_s \ll 1$ where κ is the number of OFDM symbols in one frame, $\Delta f_r$ can be ignored. In this example, denote the symbol in the n-th sub-carrier by $\tilde{s}[n]$. The received signal in the n-th sub-carrier can be approximated by $$\tilde{r}[n] = e^{j2\pi\Delta f_r t_0} \bar{h}[n]\tilde{x}[n] + \tilde{w}[n], \quad (11)$$

where $t_0$ is the time stamp of this received symbol, and $e^{j2\pi f_r t_0}$ is the difference between $t=t_0$ and $t=0$ in the effective channel.

Figure 2:
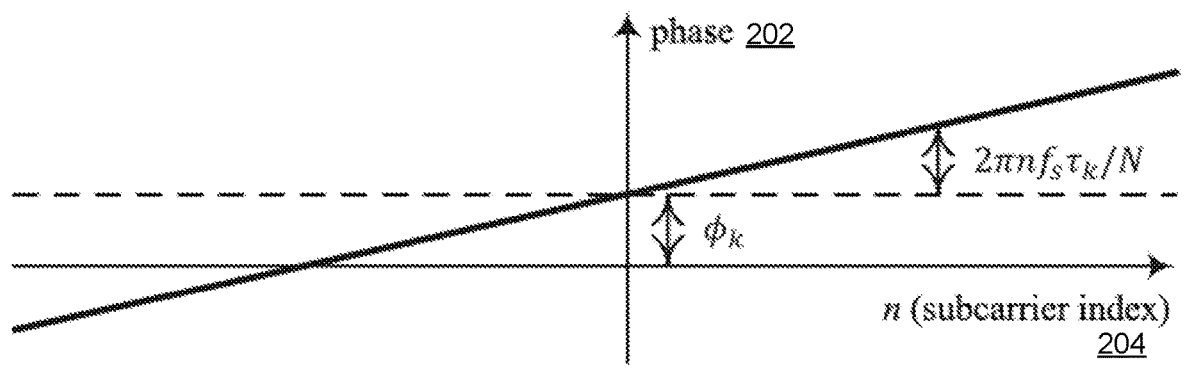
FIG. 2 illustrates example frames that can facilitate synchronization for OFDM-based OTA aggregation, in accordance with an embodiment of this disclosure.

FIG. 2 illustrates example frames 200 that can facilitate synchronization for OFDM-based OTA aggregation, in accordance with an embodiment of this disclosure. Frames 200 comprises initialization preamble 202 (which comprises frame timing 204, and CFO estimation 206); digital transmission frame 220 (which comprises frame timing 222, CFO estimation 224, orthogonal pilot sequence 226, and data symbols 228); and OTA frame 240 (which comprises frame timing 242, common pilot 244, and OTA data sequence 246). Frames 200 illustrates an example transmission frame structure for three different types of frames: an initialization preamble frame, a digital transmission frame, and an OTA frame.

In an implementation according to the present techniques, there can be three types of transmission frames. One type of transmission frame can be a preamble for initialization. The frame structure of an initialization preamble is shown in initialization preamble 202. The initialization preamble comprises two sub-frames: a FT sub-frame, and a CFO estimation sub-frame. In the initialization preamble, a long CFO sequence can be used to perform CFO estimation and adjustment as a beginning of an OTA procedure. In an implementation according to the present techniques, a length of the CFO in the preamble can be 106 (that is, 65.1 milliseconds (ms) with a 15.36 megahertz (MHz) digital baseband sampling rate).

Another type of transmission frame can be a digital transmission frame. The frame structure of a digital transmission frame is shown in digital transmission frame 220. Compared to a preamble for initialization, a CFO sub-frame in a digital transmission frame can be shorter, and set to a length of two OFDM symbols. In addition, an orthogonal pilot can be adopted for channel estimation, which can comprise K OFDM symbols. An orthogonal pilot OFDM symbol can comprise 256 sub-carriers with a 32-length cyclic prefix, and adopts 4-QAM (quadrature amplitude modulation) modulation. Data symbols can be followed with orthogonal pilots, which can adopt 16-QAM.

Another type of transmission frame can be an OTA aggregation frame. The frame structure of an OTA aggregation frame is shown in OTA frame 240. In contrast to a digital transmission frame, it can be that a OTA aggregation frame does not have a CFO sub-frame. The OTA aggregation frame can use one common OFDM symbol for all sensors, and the analog data can be modulated with pulse amplitude modulation in each OFDM subcarrier.

Figure 3:
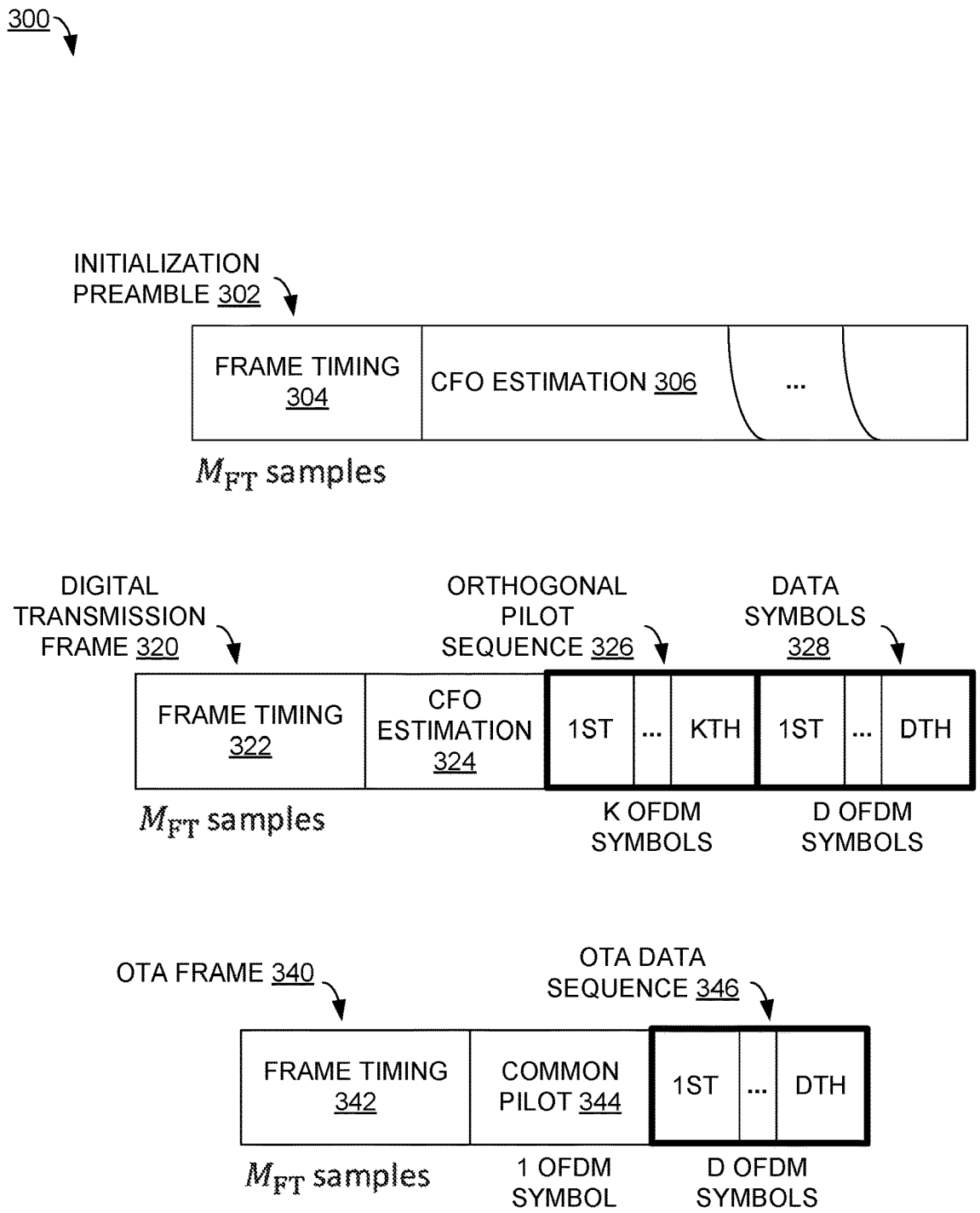
FIG. 3 illustrates an example graph that can facilitate synchronization for OFDM-based OTA aggregation, in accordance with an embodiment of this disclosure.

FIG. 3 illustrates an example graph 300 that can facilitate synchronization for OFDM-based OTA aggregation, in accordance with an embodiment of this disclosure. Graph 300 comprises phase 302 on the y-axis and n (subcarrier index) 304 on the x-axis. Graph 300 illustrates a phase response of the effective OTA aggregation channel of a k-th sensor.

In order to realize analog waveform superposition, a channel-inversion transmitter can be implemented to pre-equalize channel coefficients of different sensors in each sub-carrier based on the downlink estimated channel. Combining with a residual CFO effect, the effective downlink channel of the k-th sensor at time $t_{DL}^{(k)}$ can be given by:

$$\bar{h}_{DL}^{(k)}[n] = e^{j2\pi(\Delta f_r^{(k)} t_{DL}^{(k)} + nf_s \Delta T_{DL}^{(k)}/N)} \tilde{a}_k[n], \quad (12)$$

where $\Delta f_r^{(k)}$ is the residual CFO of the k-th sensor and $\Delta T_{DL}^{(k)}$ is the downlink TO. Note that the residual CFO of the uplink channel is opposite to that of the downlink channel. Thus, the effective uplink channel of the k-th sensor at time $t_{UL}^{(k)}$ can be given by $$\tilde{h}_{UL}^{(k)}[n] = e^{j2\pi\left(-\Delta f_r^{(k)} t_{UL}^{(k)} + n f_s \Delta T_{UL}^{(k)}/N\right)} \tilde{a}_k[n], \quad (13)$$

where the $\Delta T_{UL}^{(k)}$ is the uplink TO. After pre-equalization, the UL uplink received aggregated signal of the n-th subcarrier at the AP can be given by $$\tilde{r}_{OTA}[n] = \sum_k \tilde{h}_{UL}^{(k)}[n] \frac{\tilde{x}_k[n]}{\tilde{h}_{DL}^{(k)}[n]} + \tilde{w}[n] \quad (14)$$
$$= \sum_k \underbrace{e^{j(\phi_k + 2\pi n f_s \tau_k/N)}}_{\text{effective OTA channel}} \tilde{x}_k[n] + \tilde{w}[n],$$

where $\phi_k = 2\pi \Delta f_r^{(k)}(t_{DL}^{(k)} + t_{UL}^{(k)})$, and $\tau_k = \Delta T_{UL}^{(i)} - \Delta T_{DL}^{(k)}$.

The effective OTA channel can be defined by $$e^{j(\phi_k + 2\pi n f_s \tau_k/N)},$$

as shown in FIG. 3. It can be observed that the OTA waveform superposition is invalid due to the non-identical effective OTA aggregation channel, which can be caused by two issues. First, there can be an unknown phase $\phi_k$ due to the existence of the residual CFO. Second, the imperfection of the frame timing can cause a timing offset difference $\tau_k$ in OTA computation for the k-th sensor, which can cause imperfect compensation of the channel response. Therefore, the k-th sensor can require $\phi_k$ and $\tau_k$ to perform a proper pre-equalization for aggregation. Note that $\phi_k$ can change with $t_{UL}^{(k)}$ and $t_{DL}^{(k)}$, and $\tau_k$ may be different with a ±1 sample between two transmissions due to a synchronization offset.

Figure 4:
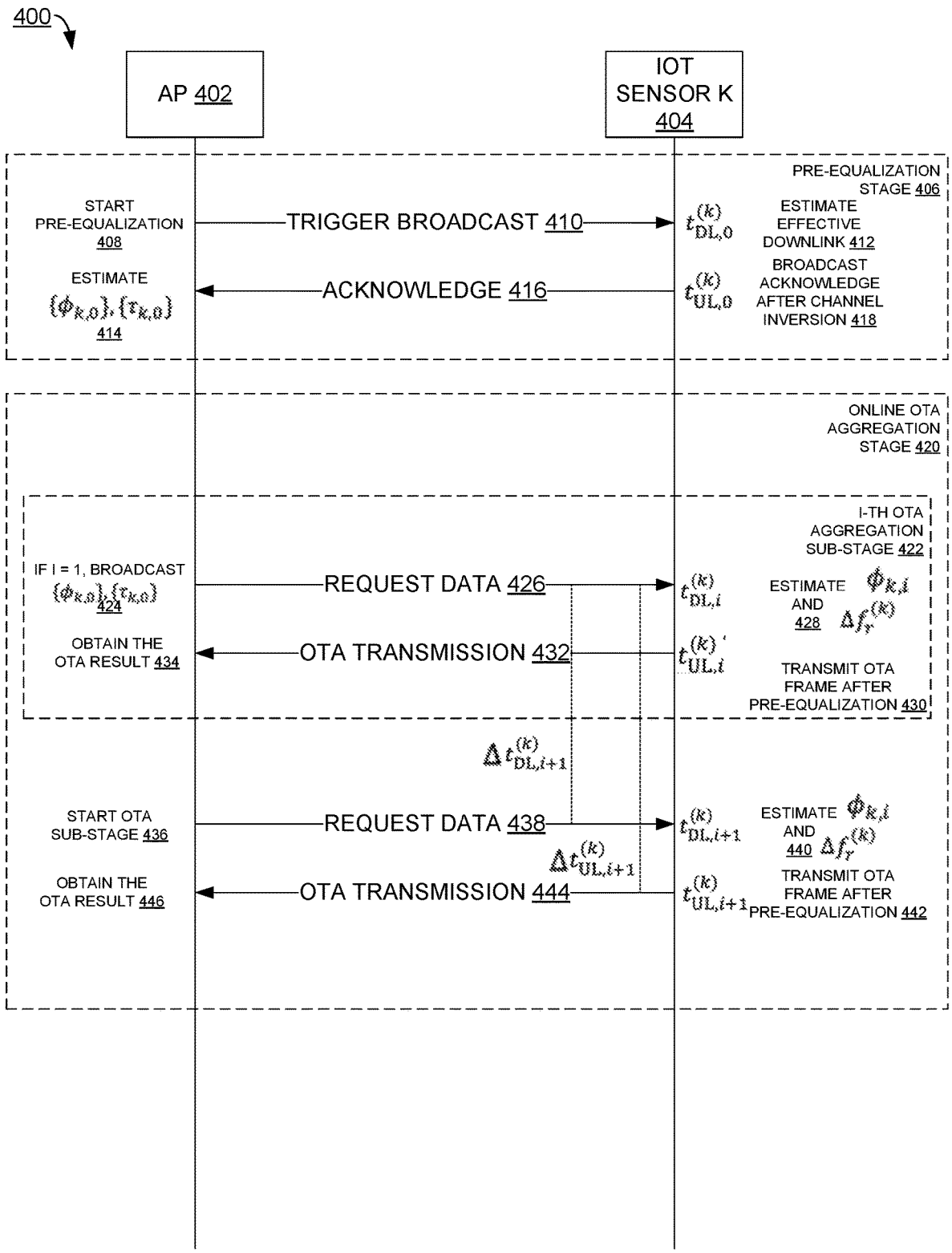
FIG. 4 illustrates an example signal flow that can facilitate synchronization for OFDM-based OTA aggregation, in accordance with an embodiment of this disclosure.

FIG. 4 illustrates an example signal flow 400 that can facilitate synchronization for OFDM-based OTA aggregation, in accordance with an embodiment of this disclosure. Single flow 400 comprises AP 402, IoT sensor K 404, pre-equalization stage 406, start pre-equalization 408, trigger broadcast 410, estimate effective downlink 412, estimate $\{\hat{\phi}_{k,0}\}$, $\{\hat{\tau}_{k,0}\}$ 414, acknowledge 416, broadcast acknowledge after channel inversion 418, online OTA aggregation stage 420, i-th OTA aggregation sub-stage 422, if I=1 broadcast $\{\hat{\phi}_{k,0}\}$, $\{\hat{\tau}_{k,0}\}$ 424, request data 426, estimate $\hat{\phi}_{k,i}$ and $\Delta f_r^{(k)}$ 428, transmit OTA after frame pre-equalization 434, OTA transmission 432, obtain the OTA result 434, start OTA sub-stage 436, request data 438, estimate $\hat{\phi}_{k,i}$ and $\Delta f_r^{(k)}$ 440, transmit OTA frame after pre-equalization 442, OTA transmission 444, and obtain the OTA result 446. Signal flow 400 can illustrate a signal flow for a physical layer OTA protocol.

Issues caused by the TO and the CFO that lead to the failure of OTA aggregation can be addressed with a Medium Access Control (MAC) protocol and corresponding techniques.

In order to estimate $\phi_k$ and $\tau_k$, a physical layer protocol can be implemented to jointly estimate and compensate the TO and CFO for the OTA aggregation procedure. As shown in FIG. 4, the OTA aggregation physical layer protocol can be considered as a two-stage handshake procedure. The first stage can be an uplink pre-equalization stage, which can compensate the initial CFO effect and multi-path fading. The second stage can be an online OTA aggregation stage, comprising multiple OTA aggregation sub-stages in which the instantaneous effect of the TO and residual CFO can be tracked and compensated. The details of steps of the protocol can be as follows.

One step of the protocol can be a pre-equalization stage (downlink signaling). Here, an AP can broadcast a digital transmission frame to trigger sensors. When the sensor k receives the frame, it can start a timer and record the current time $t_{DL,0}^{(k)}$. Then, an effective downlink channel $\tilde{h}_{DL,0}^{(k)}$ can be estimated with pilot OFDM symbols.

Another step of the protocol can be a pre-equalization stage (uplink signaling). Here, sensors can feed back a pre-equalized digital transmission from in equation 14 as acknowledgment, and record the current time $t_{UL,0}^{(k)}$. With orthogonal pilots, an AP can estimate an effective OTA aggregation channel $\{h_{OTA,0}^{(k)}\}$ in equation 14 to obtain a phase error $\{\phi_{k,0}\}$ and a timing offset $\{\tau_k,0\}$ in this stage for each sensor.

Another step of the protocol can be an online OTA aggregation stage (downlink triggering). Here, an AP can broadcast a digital transmission frame to request the OTA aggregated data. Each sensor can record the time $t_{DL,i}^{(k)}$ when receiving the frame, and estimate the effective downlink channel $\tilde{h}_{DL,i}^{(k)}$. Note that in the first OTA aggregation operation, $\{\phi_{k,0}\}$ and $\{\tau_k,0\}$ can be broadcast to the sensors by the AP.

Another step of the protocol can be an online OTA aggregation stage (uplink OTA). A timer can record a current time $t_{UL,i}^{(k)}$. The downlink and uplink period between the previous and the current OTA aggregation sub-stage, $\Delta t_{DL,i}^{(k)} = t_{DL,i}^{(k)} - t_{DL,i-1}^{(k)}$ and $\Delta t_{UL,i}^{(k)} = t_{UL,i}^{(k)} - t_{UL,i-1}^{(k)}$ can be calculated. Each user can estimate $\phi_{k,i}$ and $\tau_{k,i}$ according to the effective downlink channel $\tilde{h}_{DL,i}^{(k)}$, the downlink period $\Delta t_{DL,i}^{(k)}$, and the uplink period $\Delta t_{UL,i}^{(k)}$. Then the OTA aggregation frame can be transmitted after pre-equalization with estimated $\phi_{k,i}$ and $\tau_{k,i}$ simultaneously, which is described below.

Signaling overhead of the proposed protocol can be divided into two parts: a pre-equalization stage and an OTA stage. Considering the system with N-point OFDM, $N_{CP}$-length cyclic prefix (CP) and K sensors, the signaling overhead for pre-equalization stage can be given by $$C_{pre-equ} = (3+K)(N+N_{CP}). \quad (15)$$

In an OTA stage, considering ND, FL weights to be transmitted per sensor per iteration, the signaling overhead for M iterations OTA learning process can be given by $$C_{OTA} = M(3+D_w)(N+N_{CP}), \quad (16)$$

where the effective data for OTA-FL is $MKD_wN$. The transmission efficiency can be given by $$P_{eff} = \frac{MD_wN}{C_{pre-equ} + C_{OTA}} \quad (17)$$
$$= \frac{MD_wN}{(M(3+D_w)+3+K)(N+N_{CP})}.$$

It can be seen when $D_w \to +\infty$, that $P_{eff} = N/(N+N_{CP})$, which is independent to K, the number of sensors.

In a protocol according to the present techniques, the OTA pre-equalization can require the estimated phase noise $\{\hat{\phi}_k\}$ and the estimated timing offset $\{\hat{\tau}_k\}$. Specifically, $\{\hat{\phi}_{k,0}\}$ and $\{\hat{\tau}_{k,0}\}$ can be estimated in the pre-equalization stage at the AP side. As described with respect to FIG. 3, $\hat{\phi}_k$ can change with $t_{DL}$ and $t_{UL}$, such that in the i-th OTA aggregation sub-stage uplink step it changes to $$\phi_{k,i} = e^{-j2\pi\Delta f_r^{(k)}\left(\Delta t_{DL,i}^{(k)}+\Delta t_{UL,i}^{(k)}\right)}\phi_{k,i-1}.$$

As a result, the residual CFO $\Delta f_r^{(k)}$ can need to be estimated to perform correct OTA aggregation. The estimation approach for the desired variables can be as follows. The estimation of the channel $\tilde{h}$ can be denoted by $\hat{h}$.

As shown in FIG. 3, $\phi_{k,0}$ reflects on the intercept of the effective OTA aggregation channel phase response in the pre-equalization stage. Thus, it can be estimated through the average phase of the effective OTA aggregation channel as $$\hat{\phi}_{k,0} = \frac{1}{N-2}\sum_{n=1}^{N/2-1}\left(\angle\hat{h}_{OTA,0}^{(k)}[-n]+\angle\hat{h}_{OTA,0}^{(k)}[n]\right), \quad (18)$$

where $\angle\hat{h}_{OTA,0}^{(k)}[n+1]-\angle\hat{h}_{OTA,0}^{(k)}[n]\in(-\pi,\pi]$ can be restricted to avoid phase ambiguity.

As shown in FIG. 3, $\tau_{k,0}$ reflects on the slope of the effective OTA channel phase response in the pre-equalization stage. Thus, it can be estimated by taking the average of the phase increment of the effective OTA aggregation channel between the adjacent sub-carriers:

$$\hat{\tau}_{k,0} = \frac{N}{2\pi f_s}\angle\sum_{n=-N/2}^{N/2-2}\hat{h}_{OTA,0}^{(k)*}[n]\cdot\hat{h}_{OTA,0}^{(k)}[n+1]. \quad (19)$$

From Equation 12, the relationship between the two effective downlink channels $\tilde{h}_{DL,i-1}^{(k)}$ and $\tilde{h}_{DL,i}^{(k)}$ can be given by $$\tilde{h}_{DL,i}^{(k)}[n] = e^{j2\pi\Delta f_r^{(k)}\Delta t_{DL}^{(k)}}\tilde{h}_{DL,i-1}^{(k)}[n]. \quad (20)$$

So the residual CFO can $\Delta f_r^{(k)}$ be estimated by $$\Delta\hat{f}_r^{(k)} = \frac{1}{2\pi\Delta t_{DL,i}^{(k)}}\angle\sum_{n=-N/2}^{N/2-1}\hat{h}_{DL,i-1}^{(k)*}[n]\cdot\hat{h}_{DL,i}^{(k)}[n]. \quad (21)$$

Note that when $|\Delta f_r^{(k)}\Delta_{DL,i}^{(k)}|\geq 1/2$, there can be phase ambiguity, causing the error of $\Delta\hat{f}_r^{(k)}$. So it can be that the residual CFO must satisfy $$|\Delta f_r^{(k)}| < \frac{1}{2\Delta t_{DL,i}^{(k)}}. \quad (22)$$

With the above estimation results, the pre-equalization in the OTA aggregation stage can be designed. First, $\hat{\phi}_{k,i}$ can be given by $$\hat{\phi}_{k,i} = e^{-j2\pi\Delta\hat{f}_r^{(k)}\left(\Delta t_{DL,i}^{(k)}+\Delta t_{UL,i}^{(k)}\right)}\hat{\phi}_{k,i-1}. \quad (23)$$

Then, the ±1 sample difference between $\hat{\tau}_{k,i}$ and $\hat{\tau}_{k,i-1}$ can be obtained by comparing $\tilde{h}_{DL,i}^{(k)}$ and $\tilde{h}_{DL,i-1}^{(k)}$. Finally, the pre-equalized symbol at sensor k in the i-th OTA aggregation operation can be given by $$\tilde{x}_{k,e}[n] = \frac{1}{e^{j\left(\hat{\phi}_{k,i}+2\pi n f_s\hat{\tau}_{k,i}/N\right)}\hat{h}_{DL,i}^{(k)}[n]}\tilde{x}_k[n], \quad (24)$$

Combining Equations 14, 20, and 24, the aggregated signal at the AP can be given by $$\tilde{r}_{OTA}[n] = \sum_k \tilde{h}_{UL,i}^{(k)}[n]\tilde{x}_{k,e}[n]+\tilde{w}[n] \quad (25)$$
$$= \sum_k \tilde{x}_k[n]+\tilde{w}[n],$$

which can satisfy requirements of waveform superposition for an OTA aggregation procedure.

Effectiveness of the proposed protocol for waveform superposition can require residual CFO $|\Delta f_r^{(k)}|<1/(2\Delta_{DL,i}^{(k)})$. Thus, CFO compensation and residual CFO tracking can be critical. To address this issue, a two-step approach can be implemented to compensate the CFO for the OTA aggregation procedure: 1) initialization of coarse CFO correction, and 2) residual CFO tracking. Specifically, initialization of CFO correction can be performed immediately after the implementation enters the OTA aggregation state, and residual CFO tracking can be performed to monitor the value of the residual CFO.

At the system startup stage, an initialization of CFO correction can be performed to guarantee the residual CFO is within requirement of the system. Specifically, the CFO estimation can be performed with an initialization preamble with a maximum likelihood estimator. Given the received preamble $r_{Init}[m]$, the estimated coarse CFO $\Delta\hat{f}_c$ can be given by $$\Delta\hat{f}_c = \frac{1}{2\pi T_s L_{SPAW}}\angle\sum_{m=1}^{M_{CFO}}r_{Init}^*[m]r_{Init}[m+L_{SPAN}], \quad (26)$$

where $T_s$ is the baseband sampling period, and $L_{SPAN}$ is the length of the span, which satisfies that $\angle r_{Init}^*[m+L_{SPAN}]r_{Init}[m]=0$. As such, the coarse CFO estimation range can be $$\Delta\hat{f}_c \in \left(-\frac{1}{2T_s L_{SPAN}}, \frac{1}{2T_s L_{SPAN}}\right).$$

Residual CFO can be tracked to ensure that it satisfies a requirement of an OTA aggregation protocol since the CFO can usually varies slowly. Given a received signal with residual CFO $\Delta f_r$ by Equation 13, and that the channel is unchanged during the OTA aggregation procedure, the received signal in the n-th subcarrier at time $t_p$ can be denoted as $\tilde{r}[n](t_p)$, which can be obtained by $$\tilde{r}[n](t_p) = e^{j2\pi \Delta f_r t_p} \tilde{h}[n]\tilde{x}[n] + \tilde{w}[n]. \quad (27)$$

An estimated residual CFO $\Delta \hat{f}_r$ can be obtained by periodically sending an identical pilot frame. Specifically, for N-point OFDM symbols, the $\Delta \hat{f}_r$ at time $t_p$ can be given by $$\Delta \hat{f}_r = \frac{1}{(t_p - t_{p-1})N} \sum_{n=1}^{N} L \frac{\tilde{r}[n](t_p)}{\tilde{r}[n](t_{p-1})} \quad (28)$$
$$= \Delta f_r + \phi_w, p = 1, \ldots, P,$$

where $\phi_w \sim N(0, \sigma_{\phi_w}^2)$ is the phase noise caused by additive Gaussian noise. Given Equation 14, the sequential estimation of the CFO can be denoted as $\Delta \bar{f}_r(t_p)$, which can be given by $$\Delta \bar{f}_r(t_p) = \frac{p-1}{p} \Delta \bar{f}_r(t_{p-1}) + \frac{1}{p} \Delta \hat{f}_r(t_p), \forall p. \quad (29)$$

Figure 5:
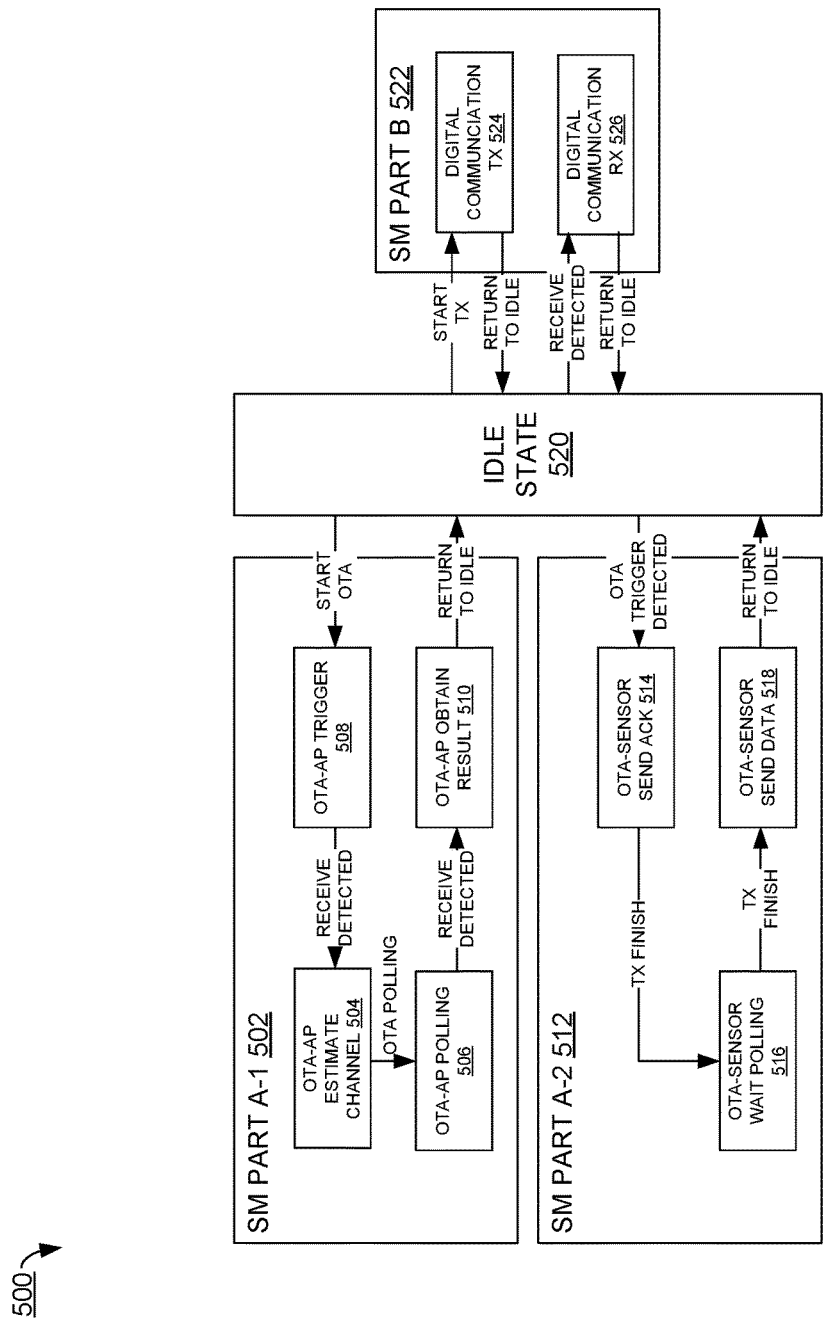
FIG. 5 illustrates an example system architecture that can facilitate synchronization for OFDM-based OTA aggregation, in accordance with an embodiment of this disclosure.

FIG. 5 illustrates an example system architecture 500 that can facilitate synchronization for OFDM-based OTA aggregation, in accordance with an embodiment of this disclosure. System architecture 500 comprises system 502, programmable microprocessor 504, application 506, bottom-level driver 508, physical interface 510, programmable logic field-programmable gate array 512, transceiver 514, data exchange 516, and bus 518.

System architecture 500 can illustrate an example structure of a implementation system. There can be two parts in the system: programmable microprocessor 504, which can run an application and driver; and programmable logic field-programmable gate array 512, which can physical layer transceiver modules. Data exchange can be handled by a bus.

As shown in FIG. 5, a implementation system can comprise two major parts: 1) the programmable software (PS) ARM, and 2) the programmable logic (PL) FPGA. Key signal processing modules can be designed in PL, and these modules can be controlled by PS. The data exchange between PS-PL can be performed with a physical AXI bus.

FIG. 5 can illustrate a structure of an implementation system. In this example, there are two parts in the system: 1) the PS part, which runs the software application and driver, and 2) the PL part, which runs the physical layer transceiver modules. The data exchange between PS-PL can be handled by a bus.

Figure 6:
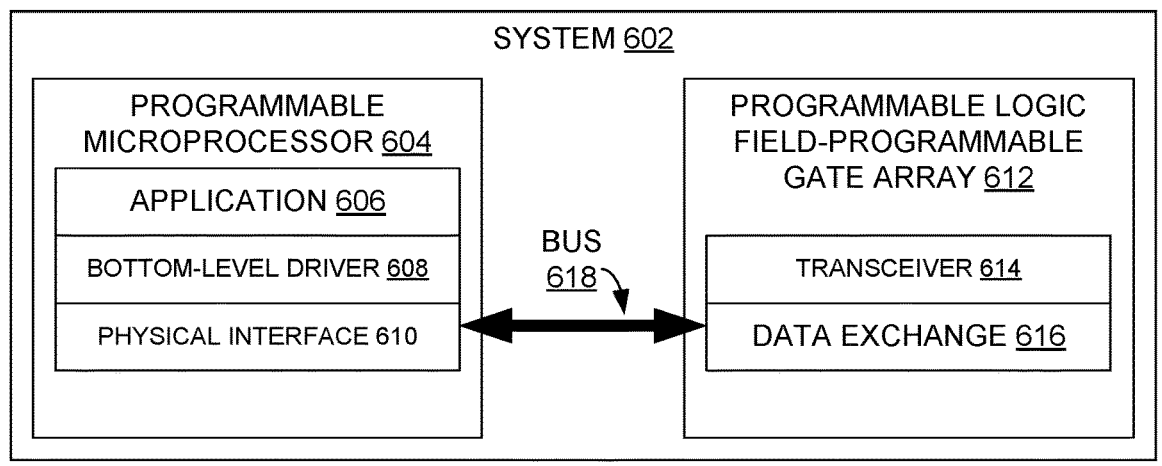
FIG. 6 illustrates an example system architecture that can facilitate synchronization for OFDM-based OTA aggregation, in accordance with an embodiment of this disclosure.

FIG. 6 illustrates an example system architecture 600 that can facilitate synchronization for OFDM-based OTA aggregation, in accordance with an embodiment of this disclosure. System architecture 600 comprises SM part A-1 602, OTA-AP estimate channel 604, OTA-AP polling 606, OTA-AP trigger 608, OTA-AP obtain result 610, SM part A-2 612, OTA-sensor send ACK 614, OTA-sensor wait polling 616, OTA-sensor send data 618, idle state 620, SM part B 622, digital communication Tx 624, and digital communication Rx 626.

System architecture 600 can illustrate a state machine for control logic in an example system. The system initialization state can be the IDLE state, and the state transition can depend on last state and input signals. The state machine can be divided into two parts: part A can be for the OTA, and part B can be for digital communication.

Figure 7:
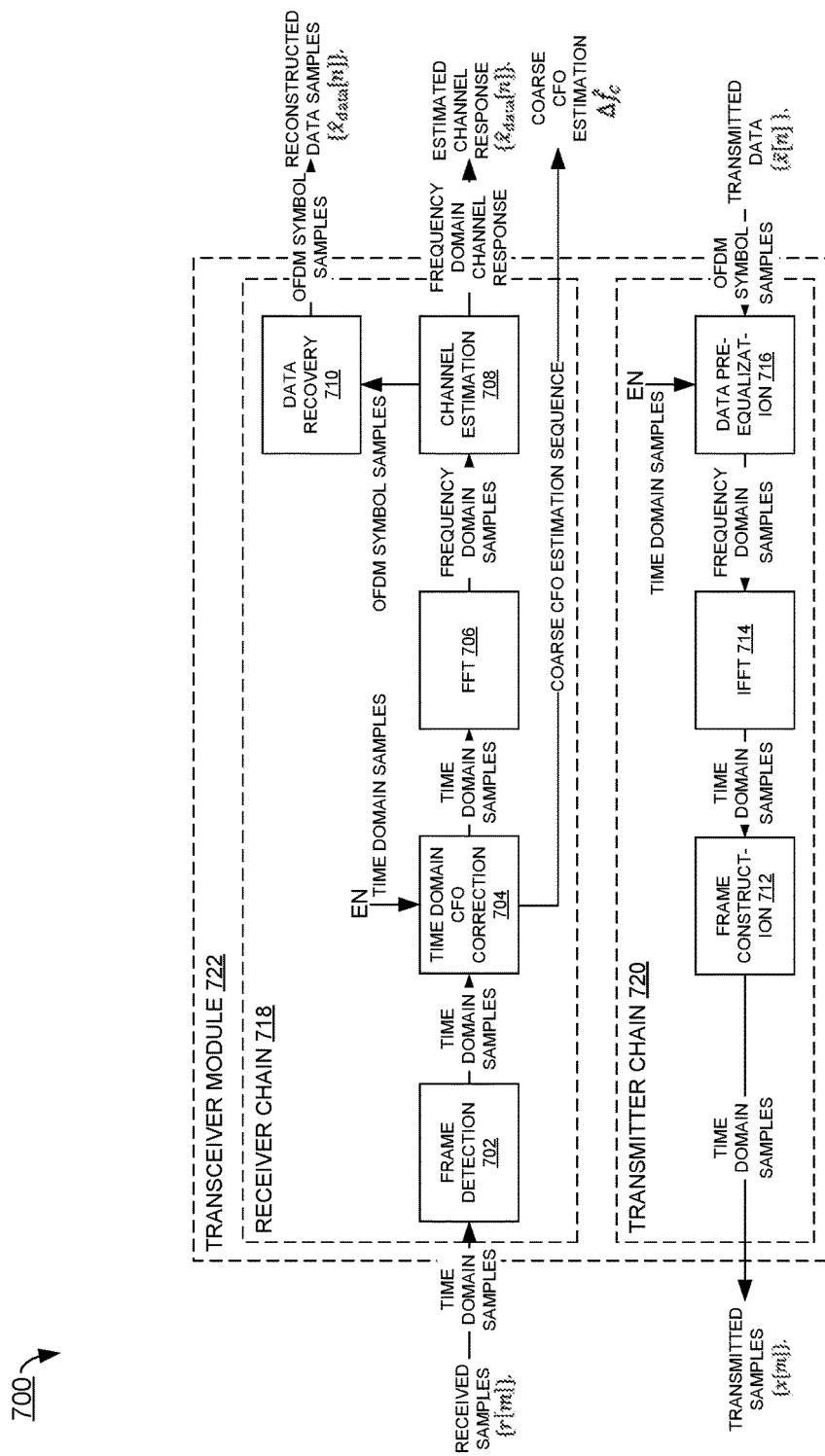
FIG. 7 illustrates an example system architecture that can facilitate synchronization for OFDM-based OTA aggregation, in accordance with an embodiment of this disclosure.

FIG. 7 illustrates an example system architecture 700 that can facilitate synchronization for OFDM-based OTA aggregation, in accordance with an embodiment of this disclosure. System architecture 700 comprises frame detection 702, time domain CFO correction 704, fast Fourier transform (FFT) 706, channel estimation 708, data recovery 710, frame construction 712, inverse fast Fourier transform (iFFT) 714, data pre-equalization 716, receiver chain 718, transmitter chain 720, and transceiver module 722.

System architecture 700 illustrates a physical layer transceiver structure. An upper link can comprise a receiver channel, and a bottom link can comprise a transmitter channel. Two enable signals can be controlled by a state machine control logic for either digital communication purposes or OTA purposes.

Control logic for the transceiver can be implemented as a state machine (SM), which is shown in FIG. 6. As FIG. 6 shows, each block can represent state, and the state transition depends on the previous state and current input signals. The SM can be divided into two parts. In part A, the SM can provide the control logic for an OTA aggregation operation, and in part B, it can provide the control logic for digital communication. The SM part A can be implemented according to a protocol according to the present techniques.

A implementation according to the present techniques can perform real-time signal processing in a PL field-programmable gate array (FPGA) with a customized transceiver module. The structure of the transceiver module is shown in FIG. 7. As shown in FIG. 7, the transceiver comprises a transmitter chain and a receiver chain comprising of four sub-modules: 1) a frame detection and timing module, 2) a CFO estimation and compensation module, 3) a channel estimation and compensation module, and 4) a data pre-equalization module.

Figure 8:
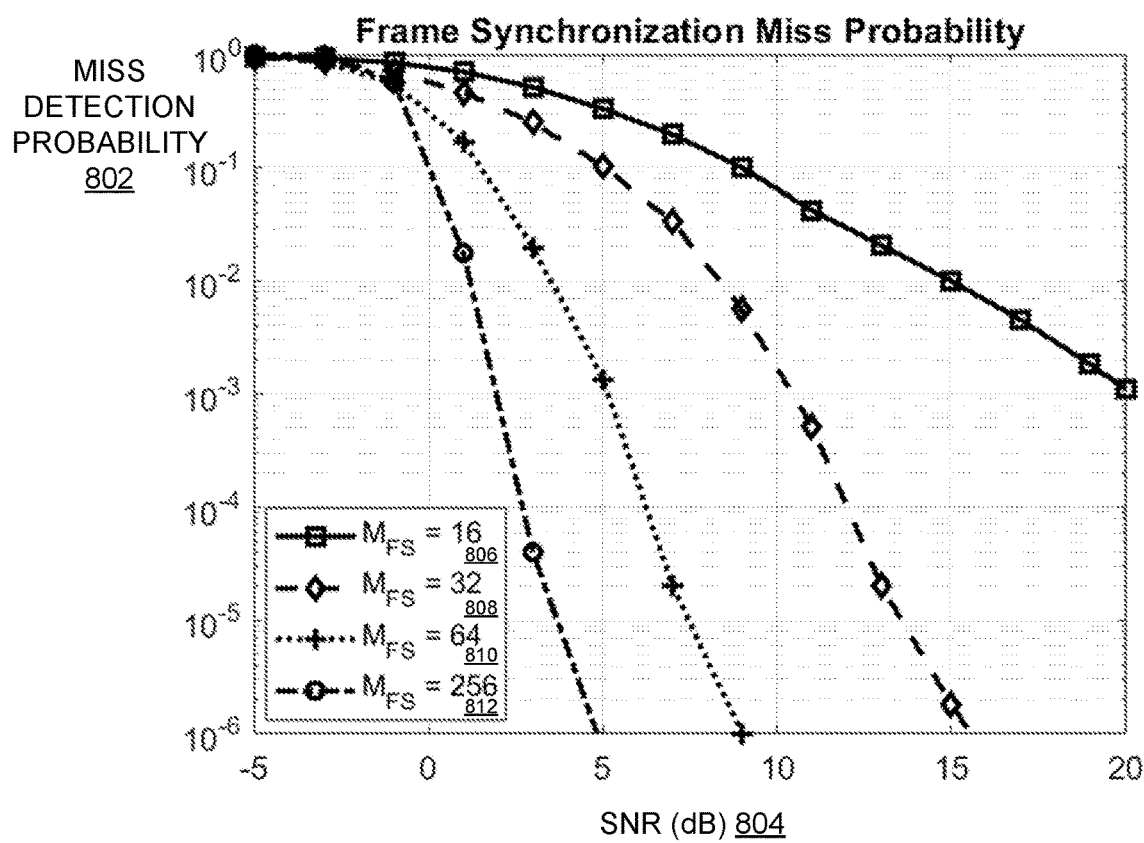
FIG. 8 illustrates an example graph that can facilitate synchronization for OFDM-based OTA aggregation, in accordance with an embodiment of this disclosure.

FIG. 8 illustrates an example graph 800 that can facilitate synchronization for OFDM-based OTA aggregation, in accordance with an embodiment of this disclosure. Graph 800 comprises miss detection probability 802 on the y-axis, SNR decibel (dB) on the x-axis, plot 806, plot 808, plot 810, and plot 812. FIG. 8 can illustrate performance of a frame synchronization module.

A frame detection and timing module can find a start point of a received frame, which can be realized with a differential decoder and correlator. To be specific, the received samples can first be differentially decoded, and then cross correlation can be performed with a known PR BPSK sequence as $$\hat{q}[m] = \text{sign}\,(r[m]r^*[m+2]), \quad (30)$$

$$\text{Corr}[m'] = \sum_{m=-\infty}^{\infty} \hat{q}[m]q[m - m'], \quad (31)$$

where Corr[m'] is the output result of the correlation sequence. Under a noise-free channel, a maximum correlation output value can be equal to $M_{FT}-2$. A start point of a frame $m_0$ can be obtained as $$m_0 = \underset{m'}{\text{argmax}} |\text{Corr}[m']| - M_{FT} + 1. \quad (32)$$

A threshold $Y_{th}$ can be defined so that only $\text{Corr}[m_0] \geq Y_{th}$ is denoted as a valid correlation output, and $$Y_{th} = \frac{M_{FT} - 2}{2}$$

can be set. The frame timing performance can be evaluated as depicted in FIG. 8. In particular, the AP can periodically transmit timing sequences, and detection failures can be counted to calculate the miss detection probability. As seen from a simulation, a longer FT sequence can achieve a lower probability of miss detection.

Figure 9:
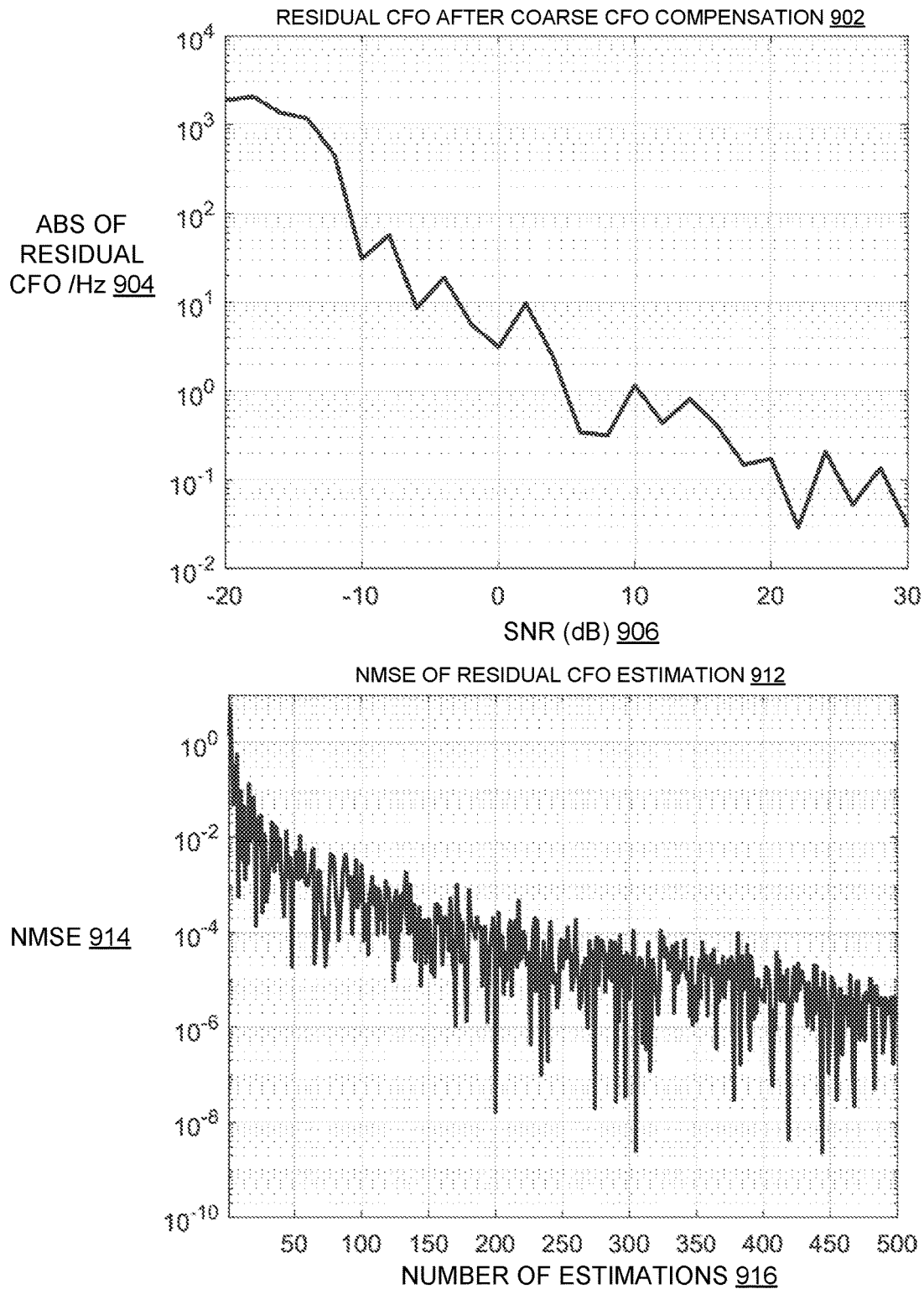
FIG. 9 example graphs that can facilitate synchronization for OFDM-based OTA aggregation, in accordance with an embodiment of this disclosure.

FIG. 9 example graphs 900 that can facilitate synchronization for OFDM-based OTA aggregation, in accordance with an embodiment of this disclosure. Graphs 900 comprises residual CFO after coarse CFO compensation 902 (which comprises abs of residual CFO/Hz 904 on the y-axis and SNR (dB) 906 on the x-axis), and NMSE of residual CFO estimation 912 (which comprises NMSE 914 on the y-axis and number of estimations 916 on the x-axis).

FIG. 9 can illustrate CFO estimation performance. In FIG. 9, a coarse CFO estimation sequence length is 106. Residual CFO after coarse CFO compensation 902 illustrates the residual CFO after coarse CFO estimation and compensation. NMSE of residual CFO estimation 912 illustrates the NMSE of residual CFO estimation with SNR=0 dB.

After a start point of the received frame, a coarse CFO estimation sequence can be obtained. As introduced above with respect to CFO estimation, the coarse CFO estimation can be performed with a maximum likelihood estimator. The estimated coarse CFO can be compensated for both digital transmission and an OTA procedure. To evaluate performance of a coarse CFO estimation, a normalized mean square error (NMSE) of the estimated coarse CFO can be defined as $$NMSE_{CFO} = \frac{\|\Delta \hat{f}_c - \Delta f_c\|_2^2}{\|\Delta f_c\|_2^2}. \tag{33}$$

As shown in residual CFO after coarse CFO compensation 902, the residual CFO after coarse CFO estimation and compensation can decrease with an increasing signal-to-noise ratio (SNR). With a SNR over 0 dB, a residual CFO after coarse CFO compensation can be within 10 hertz (Hz), while a requirement of maximum residual CFO in an example implementation can be 500 Hz.

After the coarse CFO is estimated and compensated, the residual CFO can be estimated and tracked sequentially by using the technique in described above with respect to CFO estimation. As shown in NMSE of residual CFO estimation 912, a NMSE of $\Delta' \hat{f}_r(t_p)$ is decreasing with respect to a number of estimations. Denoting a sequential estimation of the residual CFO at time stamp $t_p$ as $\Delta' \hat{f}_r(t_p)$, the estimation period can be given as $\Delta t = t_p - t_{p-1}$, $\forall p$. The system can request a new coarse CFO correction if $\Delta t \Delta' \hat{f}_r > 1/2$.

Figure 10:
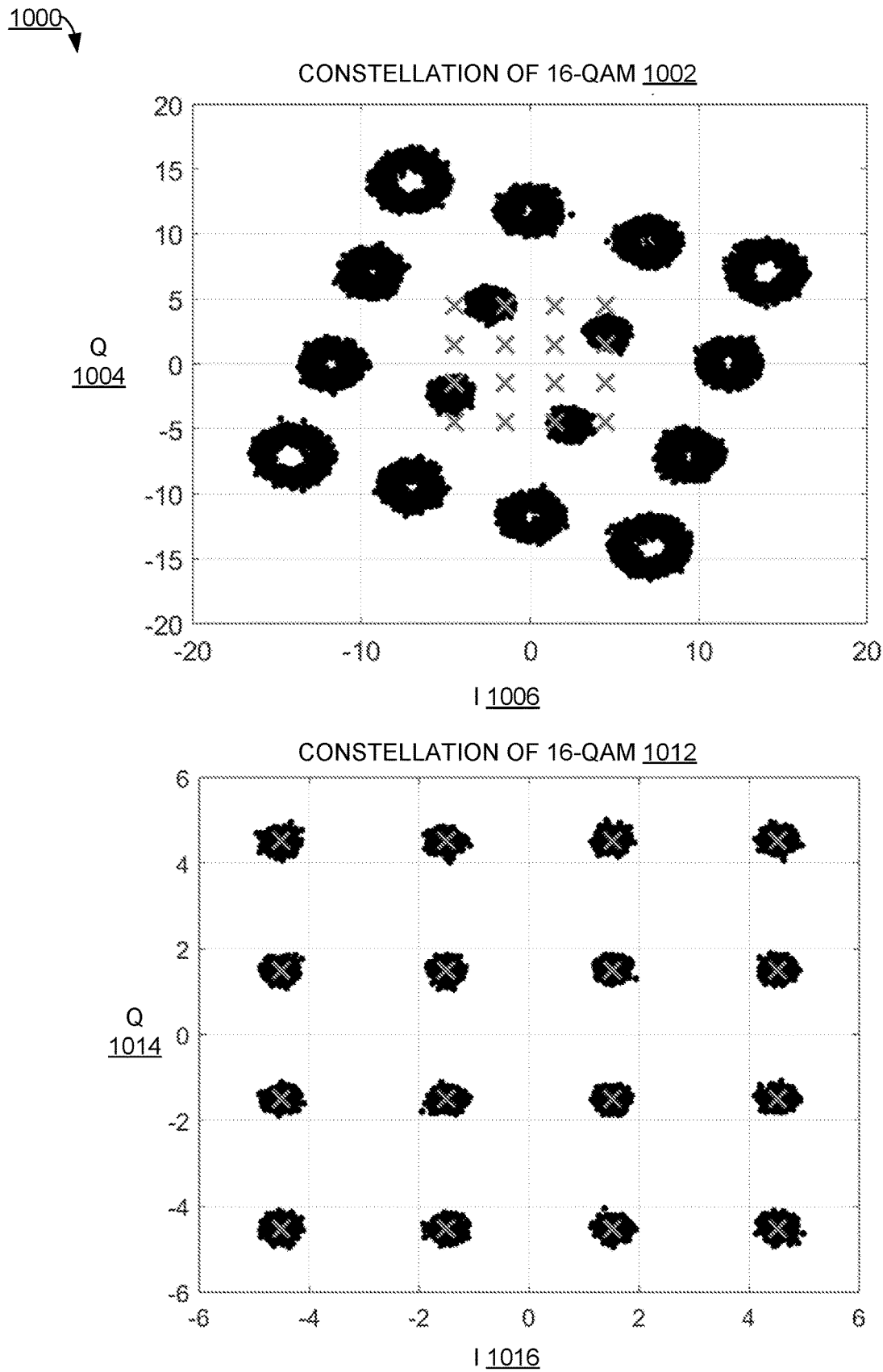
FIG. 10 illustrates example graphs that can facilitate synchronization for OFDM-based OTA aggregation, in accordance with an embodiment of this disclosure.

FIG. 10 illustrates example graphs 1000 that can facilitate synchronization for OFDM-based OTA aggregation, in accordance with an embodiment of this disclosure. Graphs 1000 comprises constellation of 16-QAM 1002 (which comprises Q 1004 on the y-axis and I 1006 on the x-axis), and constellation of 16-QAM 1012 (which comprises Q 1014 on the y-axis and I 1016 on the x-axis).

FIG. 10 illustrates a constellation of received OFDM symbols before and after channel equalization. In the example of FIG. 10, the received SNR is 30 dB. In constellation of 16-QAM 1002, the channel response is not compensated, and in constellation of 16-QAM 1012, the channel response is estimated and compensated.

Channel estimation can be performed with a least-square estimator in each sub-carrier. Received pilot OFDM symbols can be obtained with discrete Fourier transform (DFT) as $\tilde{r}'_{pilot} = DFT(r'_{pilot})$. Thus, estimated channel coefficients in the n-th sub-carrier $\hat{h}[n]$ can be given by $$\hat{h}[n] = \frac{\tilde{r}'_{pilot}[n]}{\tilde{x}_{pilot}[n]}, n = 1, \ldots, N. \tag{34}$$

The OFDM symbol $\hat{x}_{data}$ can be reconstructed with estimated channel coefficients as $\hat{x}_{data}[n] = \hat{h}^{-1}[n] \tilde{r}'_{data}[n]$, n=1, . . . , N. As shown in FIG. 10, after the channel estimation and compensation, the received 16-QAM OFDM symbols can be decoded correctly.

Figure 11:
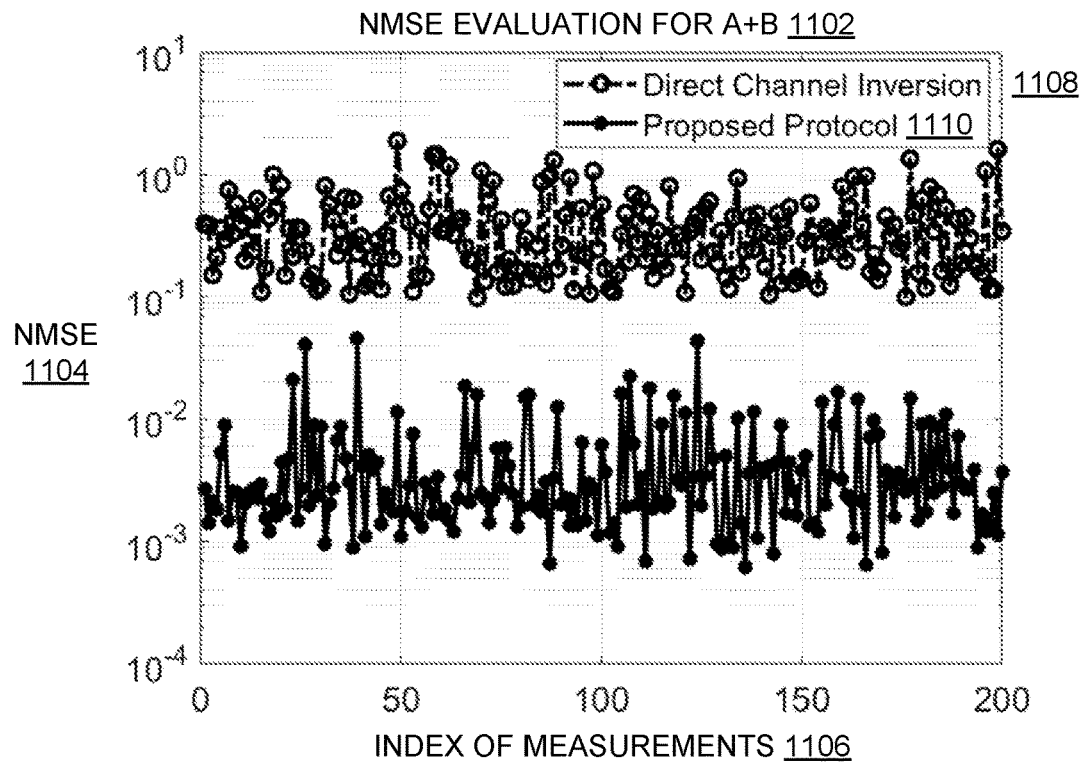
FIG. 11 illustrates example graphs that can facilitate synchronization for OFDM-based OTA aggregation, in accordance with an embodiment of this disclosure.
Figure 11:
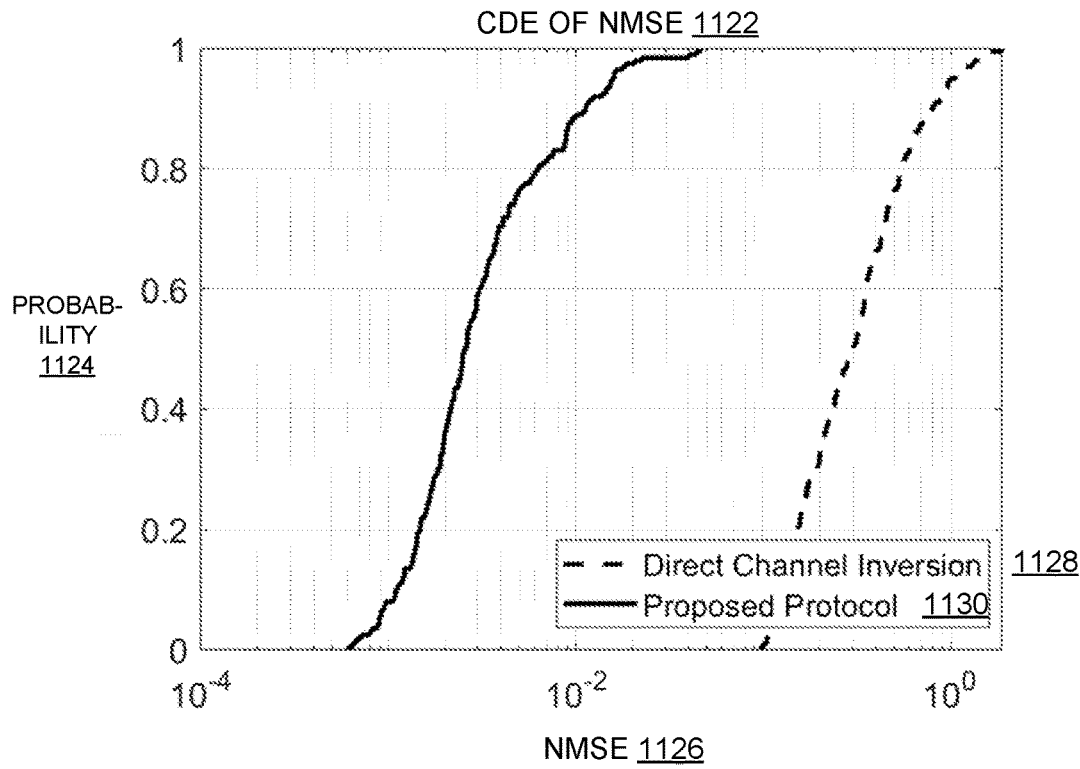

FIG. 11 illustrates example graphs 1100 that can facilitate synchronization for OFDM-based OTA aggregation, in accordance with an embodiment of this disclosure. Graphs 1100 comprises NMSE evaluation for A+B 1102 (which comprises NMSE 1104 on the y-axis, index of measurements 1106 on the x-axis, plot 1110, and plot 1112), and CDE of NMSE 1122 (which comprises probability 1124 on the y-axis, NMSE 1126 on the x-axis, plot 1128, and plot 1130).

FIG. 11 illustrates an example NMSE evaluation for $\mathcal{D}_{OTA}$. In this example, are 200 measurements, the measurement results are evaluated with/without TO and CFO compensation. NMSE evaluation for A+B 1102 shows the NMSE of each measurement result, and CDE of NMSE 1122 shows the cumulative probability function of the NMSE. It can be seen that 90% of measurements can obtain an NMSE of less than 0.01 by using the present techniques.

A data pre-equalization module can be used for OTA aggregation purposes, which follows the approach described with respect to phase error estimation and compensation, above In order to verify the performance of the proposed OTA aggregation protocol and transceiver, an 'A+B' test can be performed for two random number sequences by using an OTA aggregation approach. In particular, two IoT sensors can transmit two independent identical distributed (i.i.d.) random number sequences $d_A$ and $d_B$, and the AP an obtain the result $d_{OTA}$ with an OTA aggregation approach. Denoting a true result of $d_A + d_B$ as $d_{true}$, a NMSE of a OTA aggregation result can be evaluated, which can be given by $$NMSB_d = \frac{\|d_{OTA} - d_{true}\|_2^2}{\|d_{true}\|_2^2}. \tag{35}$$

As shown in FIG. 11, with the proposed protocol, the NMSE for OTA aggregation results can be improved significantly. In this example, the NMSE of all the results among 200 sets of measurements are less than 0.05, and 90% of the results have an NMSE of less than 0.01.

Figure 12:
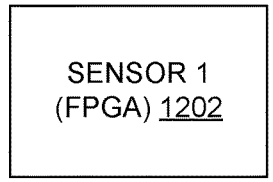
FIG. 12 illustrates an example system architecture that can facilitate synchronization for OFDM-based OTA aggregation, in accordance with an embodiment of this disclosure.
Figure 12:
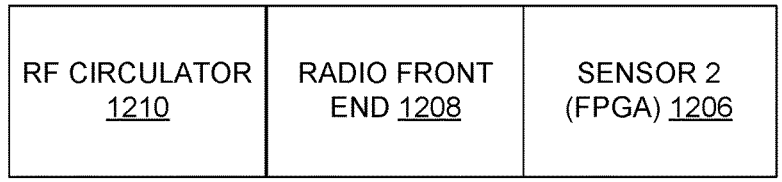
Figure 12:
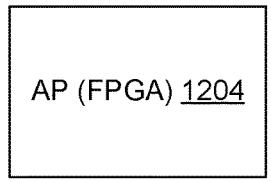

FIG. 12 illustrates an example system architecture 1200 that can facilitate synchronization for OFDM-based OTA aggregation, in accordance with an embodiment of this disclosure. System architecture 1200 comprises sensor 1 (FPGA) 1202, AP (FPGA) 1204, sensor 2 (FPGA) 1206, radio front end 1208, and RF circulator 1210.

In the example of FIG. 12, there are two sensors and one AP. Each sensor uses a FPGA for baseband signal processing, and the AP uses a FPGA for baseband signal processing. A circulator can be disposed between a transmitter and a receiver for sharing an antenna.

Figure 13:
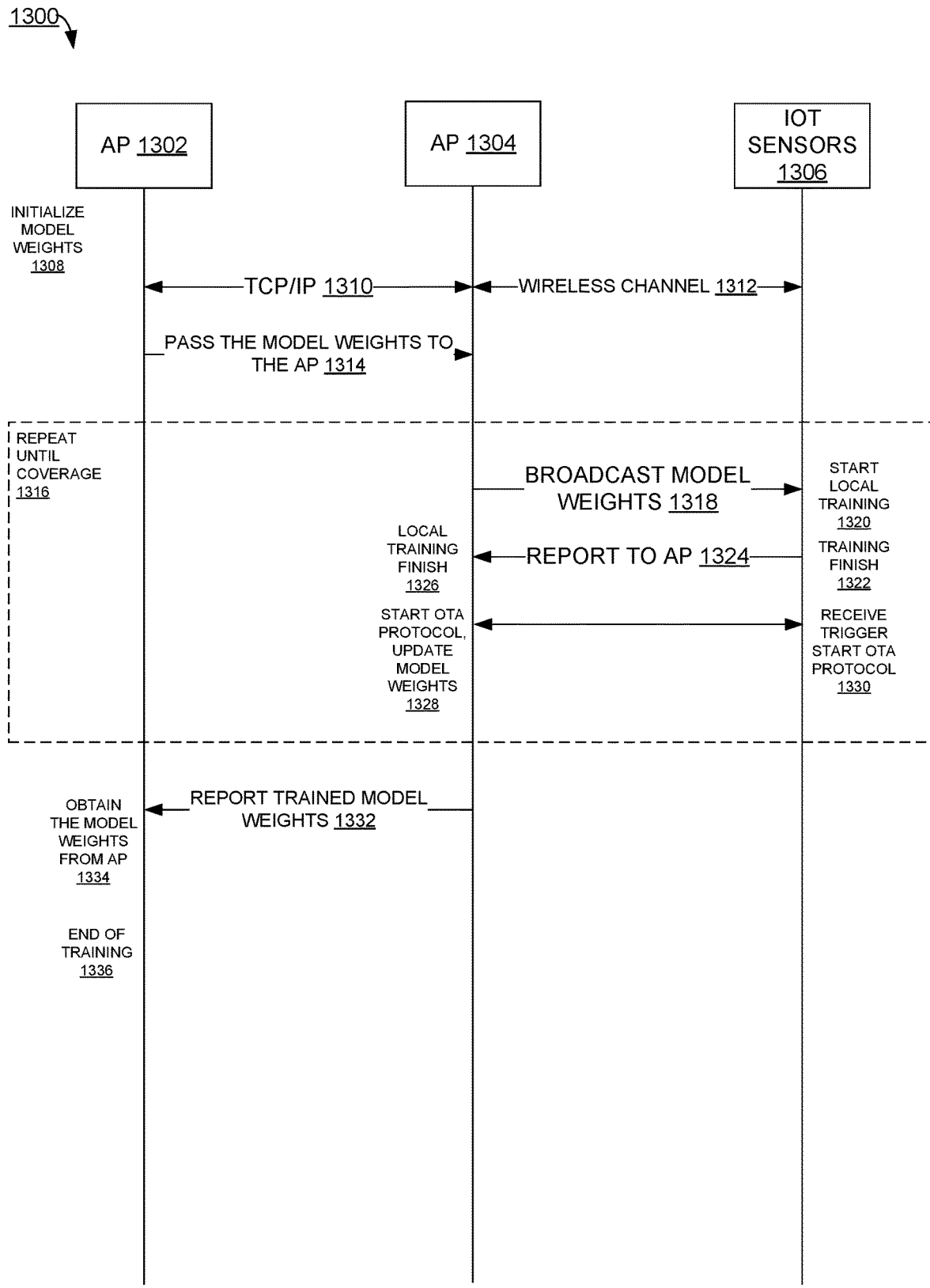
FIG. 13 illustrates an example signal flow that can facilitate synchronization for OFDM-based OTA aggregation, in accordance with an embodiment of this disclosure.

FIG. 13 illustrates an example signal flow 1300 that can facilitate synchronization for OFDM-based OTA aggregation, in accordance with an embodiment of this disclosure. Signal flow 1300 comprises host personal computer (PC) 1302, AP 1304, IoT sensors 1306, initialize model weights 1308, TCP/IP 1310, wireless channel 1312, pass the model weights to the AP 1314, repeat until coverage 1316, broadcast model weights 1318, start local training 1320, training finish 1322, report to AP 1324, local training finish 1326, start OTA protocol update model weights 1328, receive trigger start OTA protocol 1330, report trained model weights 1332, obtain the weights from AP 1334, and end of training 1336.

FIG. 13 illustrates an application layer protocol according to the present techniques. Communication between a host PC and AP can use TCP/IP.

With an OTA aggregation protocol and a transceiver module according to the present techniques, a implementation for OTA-FL can be designed. Such a implementation can comprise a hardware platform and software applications. The hardware platform can be used for implementation of a transceiver and OTA aggregation protocol, and software applications can be designed to perform FL operations. An example implementation comprises one AP and two sensors, and is configured to learn a NN federatively for a task. Note that a focus of this section can be to verify a testbed implementation of a OTA-FL. A FL application considered (coverage prediction learning) can be used for illustration. The results described herein implementation results via a FPGA and a SDR.

In the example of FIG. 12, there are two sensors and one AP. Each sensor can use a FPGA for baseband signal processing, and the AP can use a FPGA for baseband signal processing. The radio front end can comprise a radiofrequency (RF) transceiver, and a circulator can be disposed between a transmitter and a receiver for sharing an antenna.

The example of FIG. 13 illustrates an application layer protocol for a OTA implementation. Communications between a host personal computer (PC) and AP can be made via a Transmission Control Protocol/Internet Protocol (TCP/IP) protocol.

A structure of an example hardware platform is shown in FIG. 13. As shown in FIG. 13, the platform can comprise a RF front-end (RFE) and a system-on-chip (SoC) baseband processing unit. Example system parameters are listed as follows:

The digital baseband sampling rate can be 15.36 MHz;
The RF baseband sampling rate can be 30.72 MHz;
The carrier frequency can be 2.72 gigahertz (GHz), and the RF bandwidth can be 40 MHz.

A software application for FL operation can follow the application layer protocol of FIG. 13. The application layer protocol can be summarized follows.

Step 1: The host PC can idealize the model weights, and send the weights to the AP. The host PC can start the FL training operation;
Step 2: The AP can broadcast the model weights to the sensors;
Step 3: The sensors can perform local training, and perform OTA aggregation for the gradients;
Step 4: The AP can receive the OTA aggregation results and update the model weights;
Step 5: If not converged, return to Step 2;
Step 6: The AP an report the final model weights to the host PC at the end of the training.

Implementation complexity can be evaluated with respect to implementation resource. In particular, the FPGA resource utilization can be provided in the following table. A physical layer transceiver of an example implementation can consume less than 20% of resources of an example FPGA.

| Module | Resource Utilization (% of FPGA) | | | |
|---|---|---|---|---|
| TX | LUT(2.5%) | FF(2%) | BRAM(6.4%) | DSP(1%) |
| IFFT | 1449(1%) | 3372(1%) | 34(6.4%) | 9(1%) |
| Data Pre-Equ | 3437(1.5%) | 2757(1%) | 0(0%) | 3(<<1%) |
| RX | LUT(15.7%) | FF(13.8%) | RAM(3.1%) | DSP(4.9%) |
| Frame Detect | 101(<<1%) | 84(<<1%)) | 0(0%) | 0(0%) |
| CFO Est | 12758(6%) | 19620(4.4%) | 2(<<1%) | 11(1.2%) |
| CFO Comp | 7520(3.4%) | 7557(1.7%) | 1(<<1%) | 0(0%) |
| FFT | 1648(1%) | 3612(1%) | 4(1%) | 9(1%) |
| Channel Est | 73(<<1%) | 22(<<1%) | 4(1%) | 0(0%) |
| Data Recovery | 11294(5.2%) | 29515(6.7%) | 3(1%) | 24(2.7%) |

Figure 14:
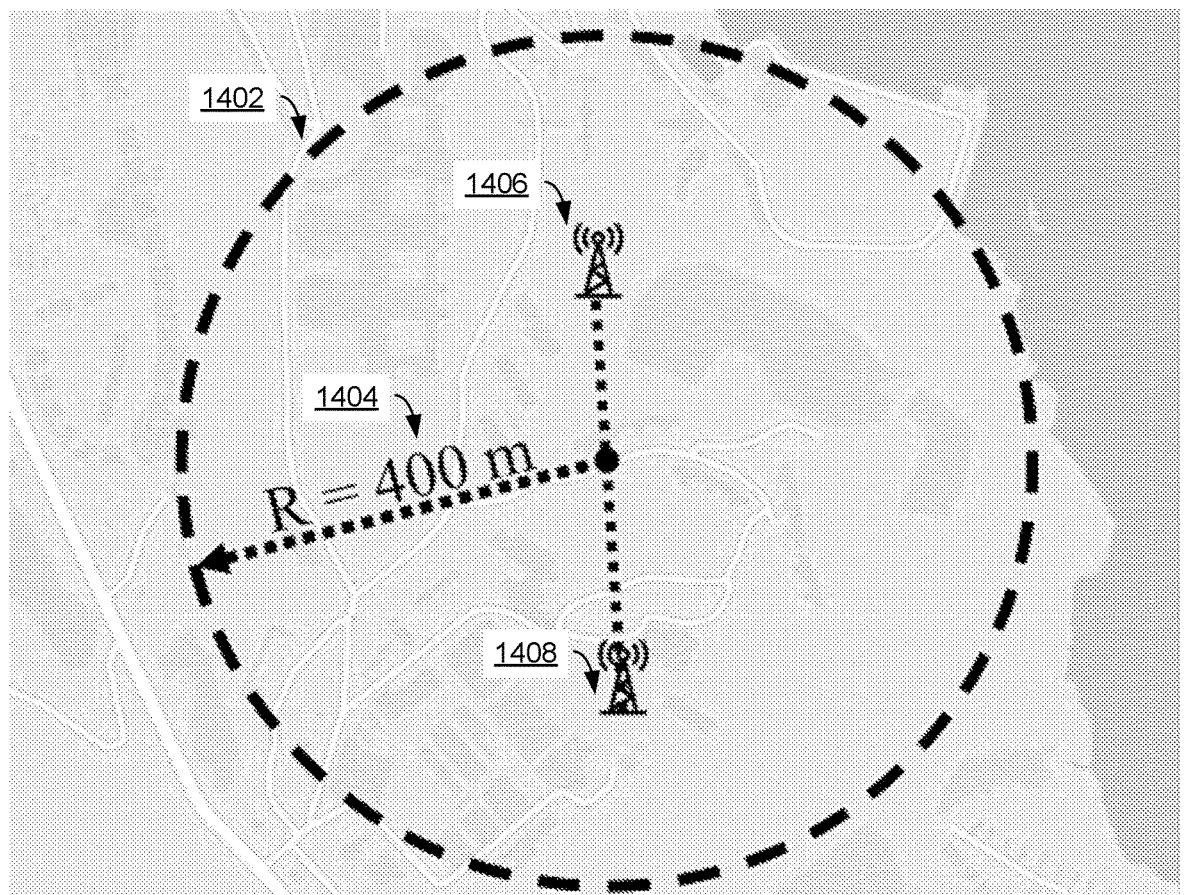
FIG. 14 illustrates an example graph that can facilitate synchronization for OFDM-based OTA aggregation, in accordance with an embodiment of this disclosure.

FIG. 14 illustrates an example graph 1400 that can facilitate synchronization for OFDM-based OTA aggregation, in accordance with an embodiment of this disclosure. Graph 1400 comprises range 1402, radius 1404, AP 1406, and AP 1408.

FIG. 14 illustrates an example received signal strength (RSS) coverage map of an AP, according to the present techniques. In this examples, two AP sites are considered, and 2,000 RSS measurements are taken within a circle with a 400 meter (m) radius from a center between two APs.

In order to verify the performance of an example implementation, a FL problem can be promoted by training a fully connected NN that predicts the RSS given GPS information (latitude and longitude) of a sensor. As shown in FIG. 14, a position of two AP sites can be set, a coverage map can be generated. With a radio coverage map, two sensors can be randomly placed within a circular area with a 400-meter radius with a center between two AP sites. The sensors can take 2,000 RSS measurements as training data. Note that, in this example, the RSS that is closer than 20 meters to the AP sites is not measured. The prediction NN can be trained with an OTA aggregation approach by using the proposed implementation. The structure of the NN can be shown in following table.

TABLE 2

NN Structure for RSS Perdition

| | Operation Layer | Size of output |
|---|---|---|
| | Input GPS | 2 |
| Fc 1 | Fully connected | 20 |
| | ReLU | 20 |
| Fc 2 | Fully connected | 20 |
| | ReLU | 20 |
| Fc 3 | Fully connected | 20 |
| | Predicted RSS | 1 |

Figure 15:
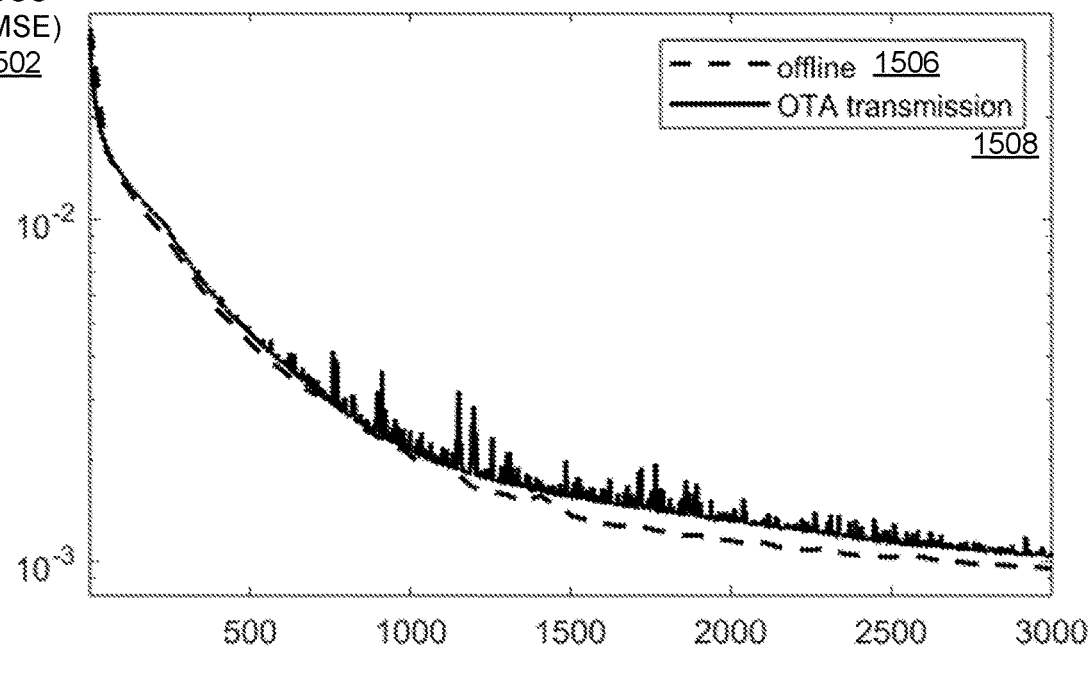
FIG. 15 illustrates an example graph that can facilitate synchronization for OFDM-based OTA aggregation, in accordance with an embodiment of this disclosure.

FIG. 15 illustrates an example graph 1500 that can facilitate synchronization for OFDM-based OTA aggregation, in accordance with an embodiment of this disclosure.

Graph 1500 comprises training loss (NMSE) on the y-axis, training rounds 1504 on the x-axis, plot 1506, and plot 1508. FIG. 15 illustrates a training performance of a FL problem.

Figure 16:
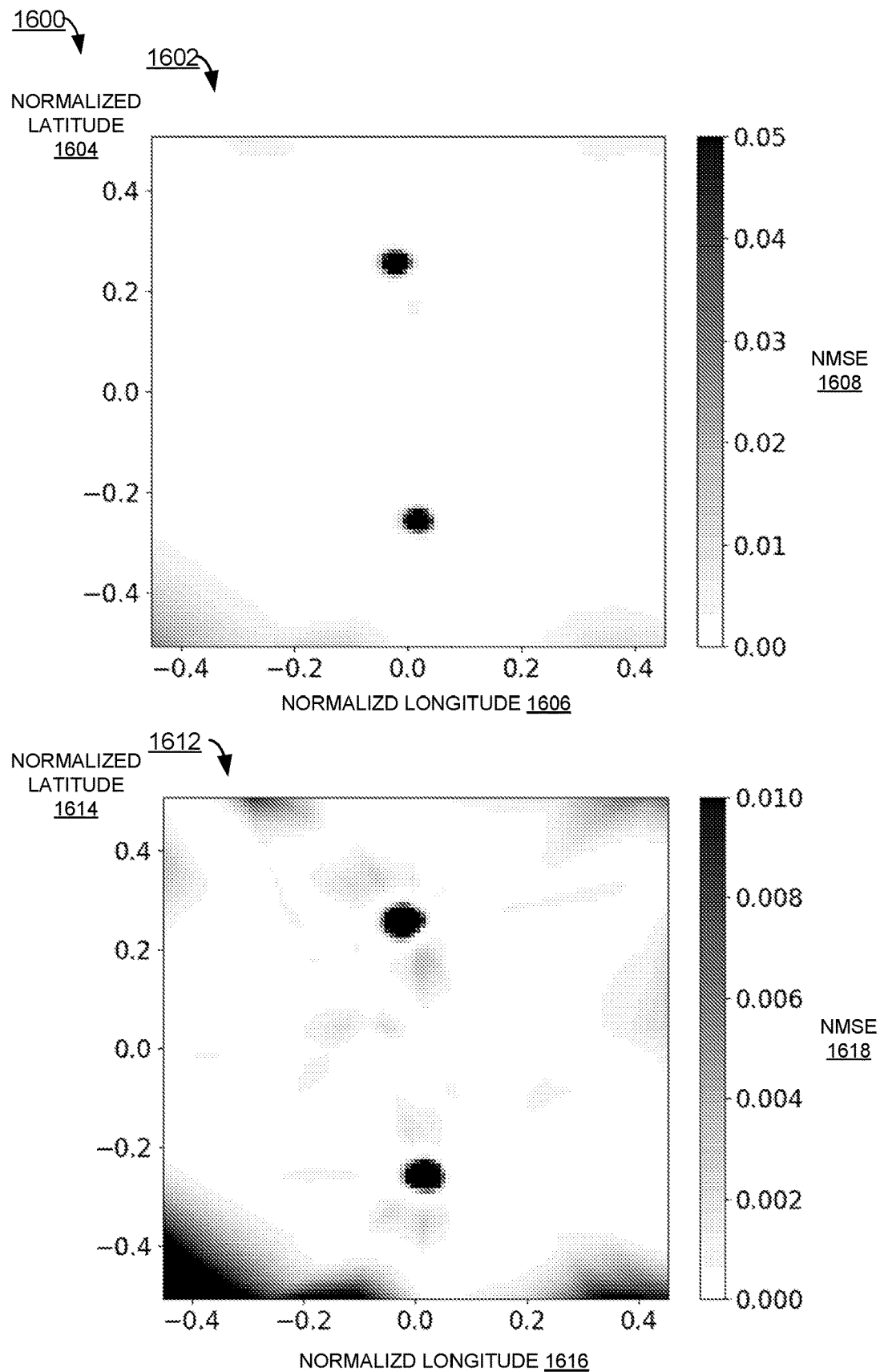
FIG. 16 illustrates example graphs that can facilitate synchronization for OFDM-based OTA aggregation, in accordance with an embodiment of this disclosure.

FIG. 16 illustrates example graphs 1600 that can facilitate synchronization for OFDM-based OTA aggregation, in accordance with an embodiment of this disclosure. Graphs 1600 comprises graph 1602 (which comprises normalized latitude 1604, normalized longitude 1606, and NMSE 1608), and graph 1612 (which comprises normalized latitude 1614, normalized longitude 1616, and NMSE 1618). FIG. 16 illustrates an example heatmap of a prediction error. In this example, the NMSE of most positions is below 0.005 with the exception of the positions that are close to AP sites due to the lack of training data.

Figure 17:
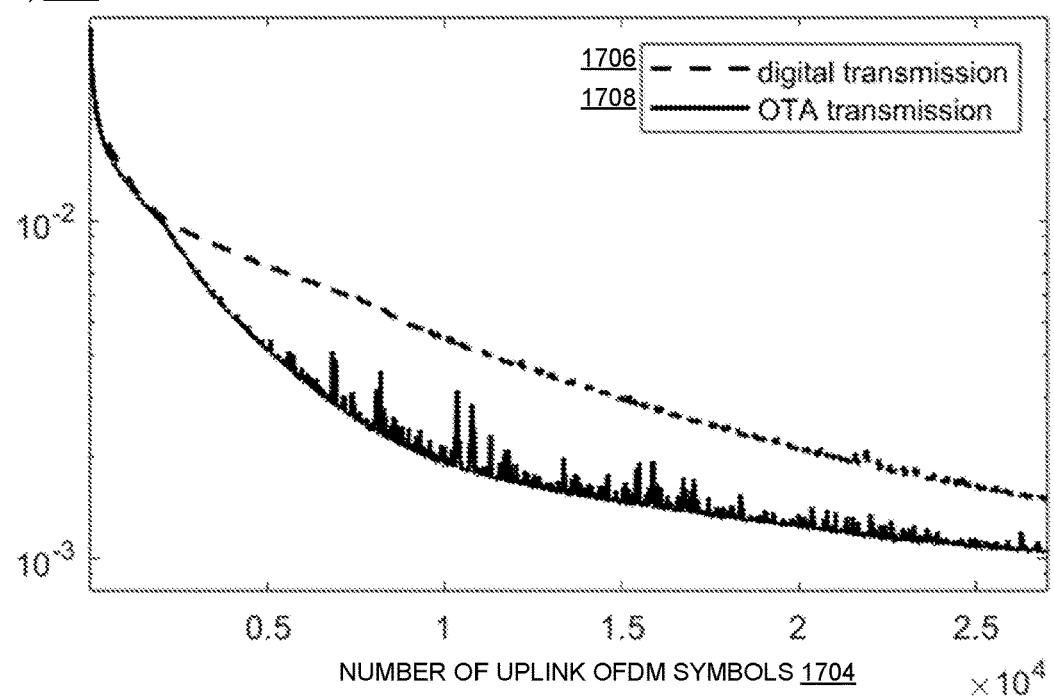
FIG. 17 illustrates an example graph that can facilitate synchronization for OFDM-based OTA aggregation, in accordance with an embodiment of this disclosure.

FIG. 17 illustrates an example graph 1700 that can facilitate synchronization for OFDM-based OTA aggregation, in accordance with an embodiment of this disclosure. Graph 1700 comprises training loss (NMSE) 1702 on the y-axis, number of uplink OFDM symbols 1704 on the x-axis, digital transmission 1706, and OTA transmission 1708. FIG. 17 illustrates an example performance comparison of digital transmission and OTA transmission.

In this subsection, an example implementation can be used to solve a promoted FL problem with a OTA approach. The step size in Equation 3 can be set by $n_t=2/(2000+t)$. Each sensor can store 1,000 pieces of training data. In each round, each sensor can randomly pick 200 samples to calculate a local stochastic gradient. To evaluate performance of the example implementation, the training loss can be shown to demonstrate the convergence, and the predicted RSS can be compared with the ground truth. The example training result is shown in FIG. 15. Here, the proposed OTA aggregation technique can achieve a similar convergence speed to the offline training, in which the local gradients of the two sensors are aggregated noiselessly. A normalized squared predication error on the test set is shown in FIG. 16.

The performance comparison of the digital transmission and the OTA transmission.

In FIG. 17, a training performance can be evaluated versus a radio resource overhead. The baseline can use digital transmission with a dedicated resource for each sensor. For fairness, the baseline can adopt 4-bit quantization for each gradient symbol such that the overall required OFDM symbols are the same as the OTA-FL for uploading one gradient vector. It can be seen that, in this example, the OTA-FL achieves superior efficiency even though there are only two sensors.

According to the present techniques, an OFDM-based over-the-air aggregation solution for a real-world federated learning task can be implemented. Specifically, an effect of frame timing offset and carrier frequency offset in the over-the-air aggregation channel can be analyzed, and a two-stage waveform pre-equalization technique with a customized multiple access protocol can be implemented to estimate and mitigate a timing offset and carrier frequency offset for over-the-air aggregation. Based on a protocol according to the present techniques, a implementation can be developed with a hardware transceiver and corresponding application software to train a deep neural network that predicts the radio signal strength with global positioning system information. To verify performance of the example implementation, experimental measurements can be performed, and they can be compared to learning results of over-the-air aggregation with offline learning results. From experimental results, it can be seen that a OFDM-based over-the-air aggregation implementation according to the present techniques is capable for real-world federated learning tasks.

What is claimed is:

1. A system, comprising:
  a processor; and
  a memory coupled to the processor, comprising instructions that, in response to execution by the processor, cause the system to perform operations, comprising:
    receiving respective data from respective sensors, wherein the respective data represents respective gradient values for a neural network produced by the respective first sensors according to a federated learning process;
    transforming the respective data into respective analog waveforms;
    applying orthogonal frequency-division multiplexing to the respective analog waveforms to produce respective aligned analog waveforms;
    creating a superposition analog waveform that comprises a superposition of the respective aligned analog waveforms; and
    transmitting the superposition analog waveform to an access point, wherein the access point is configured to update the neural network with the superposition analog waveform according to the federated learning process.

2. The system of claim 1, wherein applying orthogonal frequency-division multiplexing to the respective analog waveforms to produce the respective aligned analog waveforms comprises:
  applying respective time-domain cyclic prefixes to the respective analog waveforms.

3. The system of claim 2, wherein applying orthogonal frequency-division multiplexing to the respective analog waveforms to produce the respective aligned analog waveforms comprises:
  after applying the respective time-domain cyclic prefixes, aligning the respective analog waveforms in a frequency domain.

4. The system of claim 2, wherein applying orthogonal frequency-division multiplexing to the respective analog waveforms to produce the respective aligned analog waveforms comprises:
  determining a first length of the respective time-domain cyclic prefixes; and
  determining a second length of an orthogonal frequency-division multiplexing symbol length, wherein the second length is greater than the first length by at least a scalar criterion.

5. The system of claim 1, wherein the operations further comprise:
  after applying orthogonal frequency-division multiplexing, correcting a phase noise effect of the respective aligned analog waveforms in a frequency domain.

6. The system of claim 5, wherein correcting the phase noise effect of the respective aligned analog waveforms in the frequency domain comprises:
  performing a signaling round before transmitting consecutive over-the-air frames for data transmission.

7. The system of claim 1, wherein the respective data is generated by the respective sensors by training respective local neural networks with respective local datasets.

8. The system of claim 1, wherein applying orthogonal frequency-division multiplexing to the respective analog waveforms to produce the respective aligned analog waveforms comprises:

downsampling the respective analog waveforms to discrete values.

9. A method, comprising:
receiving, by a system comprising a processor, respective data from respective sensors, wherein the respective data represents respective gradient values for a neural network;
transforming, by the system, the respective data into respective analog waveforms;
applying, by the system, orthogonal frequency-division multiplexing to the respective analog waveforms to produce respective aligned analog waveforms;
creating, by the system, a superposition analog waveform that comprises a superposition of the respective aligned analog waveforms; and
storing, by the system, the superposition analog waveform, wherein an access point is configured to update the neural network with the superposition analog waveform according to a federated learning process.

10. The method of claim 9, further comprising:
sending, by the system, the superposition analog waveform to the access point.

11. The method of claim 10, wherein sending the superposition analog waveform to the access point comprises:
sending an initialization preamble to the access point, wherein the initialization preamble comprises a frame timing subframe and a carrier frequency offset subframe.

12. The method of claim 10, wherein sending the superposition analog waveform to the access point comprises:
sending a digital transmission frame to the access point, wherein the digital transmission frame comprises a frame timing subframe, a carrier frequency offset subframe, an orthogonal pilot sequence that comprises a first number of orthogonal frequency-division multiplexing symbols, and data symbols that comprise a second number of orthogonal frequency-division multiplexing symbols.

13. The method of claim 12, wherein the frame timing subframe comprises a third number of frame timing samples, and wherein the carrier frequency offset subframe comprises the third number of carrier frequency offset samples.

14. The method of claim 10, wherein sending the superposition analog waveform to the access point comprises:
sending an over-the-air frame to the access point, wherein the over-the-air frame comprises a frame timing subframe, a common pilot subframe, and an over-the-air data sequence subframe.

15. The method of claim 14, wherein the frame timing subframe comprises a first number of frame timing samples, wherein the common pilot subframe comprises one orthogonal frequency-division multiplexing symbol, and wherein the over-the-air data sequence subframe comprises a second number of orthogonal frequency-division multiplexing symbols.

16. A non-transitory computer-readable medium comprising instructions that, in response to execution, cause a system comprising a processor to perform operations, comprising:
receiving first data from a first sensor, wherein the first data represents first gradient values for a neural network;
receiving second data from a second sensor, wherein the second data represents second gradient values for the neural network;
transforming the first data into a first analog waveform;
transforming the second data into a second analog waveform;
applying orthogonal frequency-division multiplexing to the first analog waveform and the second analog waveform to produce a first aligned analog waveform, and a second aligned analog waveform, respectively;
creating a superposition analog waveform that comprises a superposition of the first aligned analog waveform and the second aligned analog waveform; and
storing the superposition analog waveform, wherein an access point is configured to update the neural network with the superposition analog waveform according to a federated learning process.

17. The non-transitory computer-readable medium of claim 16, wherein receiving the first data from the first sensor is based on the access point broadcasting a first digital transmission frame to trigger the first sensor and the second sensor, the first sensor starting a timer and recording a first current time based on receiving the first digital transmission frame, the first sensor feeding back a second digital transmission frame that is pre-equalized and recording a second current time, and wherein a phase error and a timing offset are determined by the access point based on receiving the second digital transmission frame.

18. The non-transitory computer-readable medium of claim 17, wherein receiving the first data from the first sensor is based on the access point broadcasting a third digital transmission frame to request the first data, the first sensor recording a third current time at which the third digital transmission frame is received, and the first sensor estimating an effective downlink channel.

19. The non-transitory computer-readable medium of claim 18, wherein receiving the first data from the first sensor is based on the first sensor modifying the first data based on the phase error and the timing offset.

20. The non-transitory computer-readable medium of claim 19, wherein the federated learning process comprises a machine-learning technique to train the neural network across multiple remote sensors that use respective local data, and independently of transmitting the respective local data.

* * * * *